United States Patent
Migos et al.

(10) Patent No.: US 10,296,177 B2
(45) Date of Patent: May 21, 2019

(54) INTERACTIVE CONTENT FOR DIGITAL BOOKS

(71) Applicant: Apple Inc., Cupertino, CA (US)

(72) Inventors: Charles J. Migos, San Bruno, CA (US); Diego Bauducco, San Francisco, CA (US); Markus Hagele, San Francisco, CA (US); Jay Christopher Capela, Santa Cruz, CA (US); Gary W. Gehiere, Campbell, CA (US); Jacob G. Refstrup, Vancouver, WA (US); Christopher Erich Rudolph, Camas, WA (US); Peter W. Rapp, Pittsburgh, PA (US); David M. Hall, Brush Prairie, WA (US); Peter G. Berger, Irwin, PA (US); Simon Antony Ward, Camas, WA (US); Mark Ambachtsheer, Vancouver, WA (US); Paul Elseth, Washougal, WA (US); Steven J. Israelson, Vancouver, WA (US); Roger Rock Rosner, Mountain View, CA (US); Yaniv Gur, Los Altos, CA (US); Alexander C. MacLean, San Jose, CA (US); M. Frank Emanuel, San Mateo, CA (US); Mac Murrett, Portland, OR (US)

( * ) Notice: Subject to any disclaimer, the term of this patent is extended or adjusted under 35 U.S.C. 154(b) by 0 days.

(21) Appl. No.: 15/677,139

(22) Filed: Aug. 15, 2017

(65) Prior Publication Data
US 2018/0018069 A1    Jan. 18, 2018

Related U.S. Application Data

(63) Continuation of application No. 13/588,432, filed on Aug. 17, 2012, now Pat. No. 9,766,782.
(Continued)

(51) Int. Cl.
*G06F 17/00*    (2019.01)
*G06F 3/0483*   (2013.01)
(Continued)

(52) U.S. Cl.
CPC ........ *G06F 3/0483* (2013.01); *G06F 15/0291* (2013.01); *G09B 5/02* (2013.01);
(Continued)

(58) Field of Classification Search
CPC ............................ G06F 3/0483; G06Q 10/10
(Continued)

(56) References Cited

U.S. PATENT DOCUMENTS

| 5,761,485 A | 6/1998 | Munyan |
| 7,103,848 B2 | 9/2006 | Barsness et al. |

(Continued)

OTHER PUBLICATIONS

International Search Report and Written Opinion for International Patent Application No. PCT/US2012/051474, filed Aug. 17, 2012, 24 pages.
(Continued)

*Primary Examiner* — Manglesh M Patel
(74) *Attorney, Agent, or Firm* — Fish & Richardson P.C.

(57) ABSTRACT

A graphical user interface (GUI) is presented that allows a user to view and interact with content embedded in a digital book, such as text, image galleries, multimedia presentations, video, HTML, animated and static diagrams, charts, tables, visual dictionaries, review questions, three-dimensional (3D) animation and any other known media content, and various touch gestures can be used by the user to move through images and multimedia presentations, play video, answer review questions, manipulate three-dimensional objects, and interact with HTML.

21 Claims, 31 Drawing Sheets

Related U.S. Application Data

(60) Provisional application No. 61/525,698, filed on Aug. 19, 2011.

(51) Int. Cl.
 *G06F 15/02* (2006.01)
 *G09B 5/02* (2006.01)

(52) U.S. Cl.
 CPC .............. *G06F 2203/04806* (2013.01); *G06F 2203/04808* (2013.01)

(58) Field of Classification Search
 USPC .......................... 715/246, 863, 200, 201, 255
 See application file for complete search history.

(56) References Cited

U.S. PATENT DOCUMENTS

| | | | |
|---|---|---|---|
| 7,213,214 B2 | 5/2007 | Baar | |
| 7,631,013 B2 | 12/2009 | Parsons et al. | |
| 7,865,817 B2 | 1/2011 | Ryan et al. | |
| 8,018,431 B1 | 9/2011 | Zehr et al. | |
| 8,194,102 B2 | 6/2012 | Cohen et al. | |
| 8,504,945 B2 | 8/2013 | Jakobson et al. | |
| 8,514,252 B1 | 8/2013 | Oplinger | |
| 8,533,622 B2 | 9/2013 | Estrada et al. | |
| 8,542,205 B1 | 9/2013 | Keller | |
| 8,621,930 B2 | 1/2014 | Clark | |
| 8,650,476 B1 | 2/2014 | Belle et al. | |
| 8,739,073 B2 | 5/2014 | Han | |
| 8,832,584 B1 | 9/2014 | Agarwal et al. | |
| 9,047,007 B2 | 6/2015 | Kodosky | |
| 9,367,227 B1 | 6/2016 | Kim | |
| 9,594,729 B2 | 3/2017 | Hagel-Sorensen | |
| 9,766,782 B2 | 9/2017 | Migos et al. | |
| 2002/0112237 A1 | 8/2002 | Kelts | |
| 2002/0138841 A1 | 9/2002 | Ward | |
| 2004/0236565 A1 | 11/2004 | Wen | |
| 2005/0175970 A1 | 8/2005 | Dunlap | |
| 2006/0147888 A1 | 7/2006 | Burghardt et al. | |
| 2006/0184966 A1 | 8/2006 | Hunleth et al. | |
| 2008/0270886 A1 | 10/2008 | Gossweiler et al. | |
| 2008/0313158 A1 | 12/2008 | Lin | |
| 2009/0210828 A1 | 8/2009 | Kahn | |
| 2010/0164836 A1 | 7/2010 | Liberatore | |
| 2011/0154260 A1 | 6/2011 | Wang et al. | |
| 2011/0242007 A1 | 10/2011 | Gray et al. | |
| 2011/0261030 A1* | 10/2011 | Bullock | G06F 15/0283 345/204 |
| 2012/0054813 A1 | 3/2012 | Carmichael | |
| 2012/0192105 A1 | 7/2012 | Groth et al. | |
| 2012/0221968 A1 | 8/2012 | Patterson | |
| 2012/0240085 A1 | 9/2012 | Sim et al. | |
| 2013/0073932 A1 | 3/2013 | Migos et al. | |
| 2013/0073998 A1 | 3/2013 | Migos et al. | |
| 2014/0195961 A1 | 7/2014 | Shoemaker et al. | |
| 2014/0281868 A1 | 9/2014 | Vogel | |
| 2014/0380244 A1 | 12/2014 | Tecarro | |
| 2015/0026176 A1 | 1/2015 | Bullock | |

OTHER PUBLICATIONS

Herrmann, Francoise. "Le Visuel Multimedia 3". ATA Chronicle, vol. 36, issue 7. Published Jul. 21, 2007. Retrieved Nov. 28, 2012. Retrieved from the internet: URL<http://www.fhphd.org/Visuel.html>. 3 pages.

"The ATA Chronicle 2007 Index." Published Dec. 31, 2007. Retrieved Nov. 28, 2012. Retrieved from the internet: URL<http://www.atanet.org/chronicle/index2007.pdf>. 22 pages.

"Madcap Flare Getting Started Guide—Version 7.1 (Chapter 4, excerpt)". Published Jul. 6, 2011. Retrieved Apr. 10, 2013. Retrieved from the Internet: URL<http://docs.madcarsoftware.com/FlareV7/FlareGettingStartedGuide.pdf>. pp. 1-45.

Talbot, Nicola. "Glossary.sty V 2.4: LATEX2e Package to Assist Generating Glossaries." Published Jul. 20, 2006. Retrieved Apr. 10, 2013. Retrieved from the Internet: URL<http://mirror.hmc.edu/ctan/macros/latex/contrib/glossary/gloassary.pdf>. 55 pages.

Ferriot, David. "Flare 7.1 Release Today with New Features, Enhancements." Published Jul. 6, 2011. Retrieved on Apr. 10, 2013. Retrieved from the internet:UCL<http://www.madcapsoftware.com/blog/2011/07/06/flare-7-1-released-today-with-new-features-enhancements/>. 2 pages.

Gsmarena Team. "Apple iPhone 4 Review: Love It or Hate It." Published Jul. 1, 2010. Retrieved Apr. 10, 2013. Retrieved from the Internet: URL<http://www.gsmarena.com/apple_iphone_4-review-490p2.php>. 3 pages.

International Preliminary Report on Patentability in International Application No. PCT/US2012/051474, dated Feb. 25, 2014, 15 pages.

European Office Action in Application No. 12753634.0, dated Mar. 3, 2016, 6 pages.

* cited by examiner

2.2 – Content

Seacula quarta decima et quinta decima Eodem modo typi? Modo typi qui nunc nobis videntur parum clari. Quam littera gothica quam nunc putamus parum claram anteposuerit litterarum formas humanitatis! Formas humanitatis per seacula quarta decima et quinta decima Eodem modo typi qui. Typi qui nunc nobis videntur parum clari fiant sollemnes in futurum. Mirum est notare quam littera.

Lorem ipsum dolor sit amet, consectetur adipiscing elit, set eiusmod tempor incidunt et labore et dolore magna aliquam. Ut enim ad minim veniam, quis nostrud exerc. Irure dolor in reprehend incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit. Pesse molestaie cillum. Tia non ob ea soluad incommod quae egen ium improb fugiend. Offoctivoicia deserunt mollit anim id est laborum Et harumd dereud facilis est er expedit distinct.

2.2.1 – Content

Seacula quarta decima et quinta decima Eodem modo typi? Modo typi qui nunc nobis videntur parum clari. Quam littera gothica quam nunc putamus parum claram anteposuerit litterarum formas humanitatis! Formas humanitatis per seacula quarta decima et quinta decima Eodem modo typi qui. Typi qui nunc nobis videntur parum clari fiant sollemnes in futurum. Mirum est notare quam littera.

Lorem ipsum dolor sit amet, consectetur adipiscing elit, set eiusmod tempor incidunt et labore et dolore magna aliquam. Ut enim ad minim veniam, quis nostrud exerc. Irure dolor in reprehend incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit. Pesse molestaie cillum. Tia non ob ea soluad incommod quae egen ium improb fugiend. Offoctivoicia deserunt mollit anim id est laborum Et harumd dereud facilis est er expedit distinct.

Nam liber te conscient to factor tum poen legum odioque civiuda et tam. Neque pecun modut est neque nonor et imper ned libidig met, consectetur adipiscing elit, sed ut labore et dolore magna aliquam is nostrud exercitation ullam mmodo consequet.

Duis aute in voluptate velit esse cillum dolore eu fugiat nulla pariatur. At vver eos et accusam dignissum qui blandit est praesent. Trenz pruca beynocguon doas nog apoply su trenz

2.2.2 – Content

Seacula quarta decima et quinta decima Eodem modo typi? Modo typi qui nunc nobis videntur parum clari. Quam littera gothica quam nunc putamus parum claram anteposuerit litterarum formas humanitatis! Formas humanitatis per seacula quarta decima et quinta decima Eodem modo typi qui. Typi qui nunc nobis videntur parum

LESSON REVIEW 1 | THE CENTRAL NERVOUS SYSTEM (CNS). — 1208
Q1: TAP TO SELECT THE AMINO ACID THAT FUNCTIONS AS A NEUROTRANSMITTER IN THE CNS.

A. LEUCINE
B. GLUTAMIC ACID
C. LYSINE — 1210
D. VALINE

CHECK ANSWER — 1206
PREVIOUS — 1204
NEXT — 1202

LESSON REVIEW 1 | THE CENTRAL NERVOUS SYSTEM (CNS).
Q4: TAP ON THE NAME THAT IS GIVEN TO THE COILED TUBE THAT FUNCTIONS AS THE AUDITORY PORTION OF THE INNER.

IMAGE *1212*

A. PINNA
B. COCHLEA
C. EAR DRUM
D. MALLEUS

CHECK ANSWER
PREVIOUS
NEXT

LESSON REVIEW 1 — 1222
Q2: TAP TO SELECT THE ANIMAL WHICH HAS MAGNETORECEPTION SENSES.

| IMAGE 1 *1220* | IMAGE 2 *1214* |
| IMAGE 3 *1218* | IMAGE 4 *1216* |

CHECK ANSWER
PREVIOUS
NEXT

1200

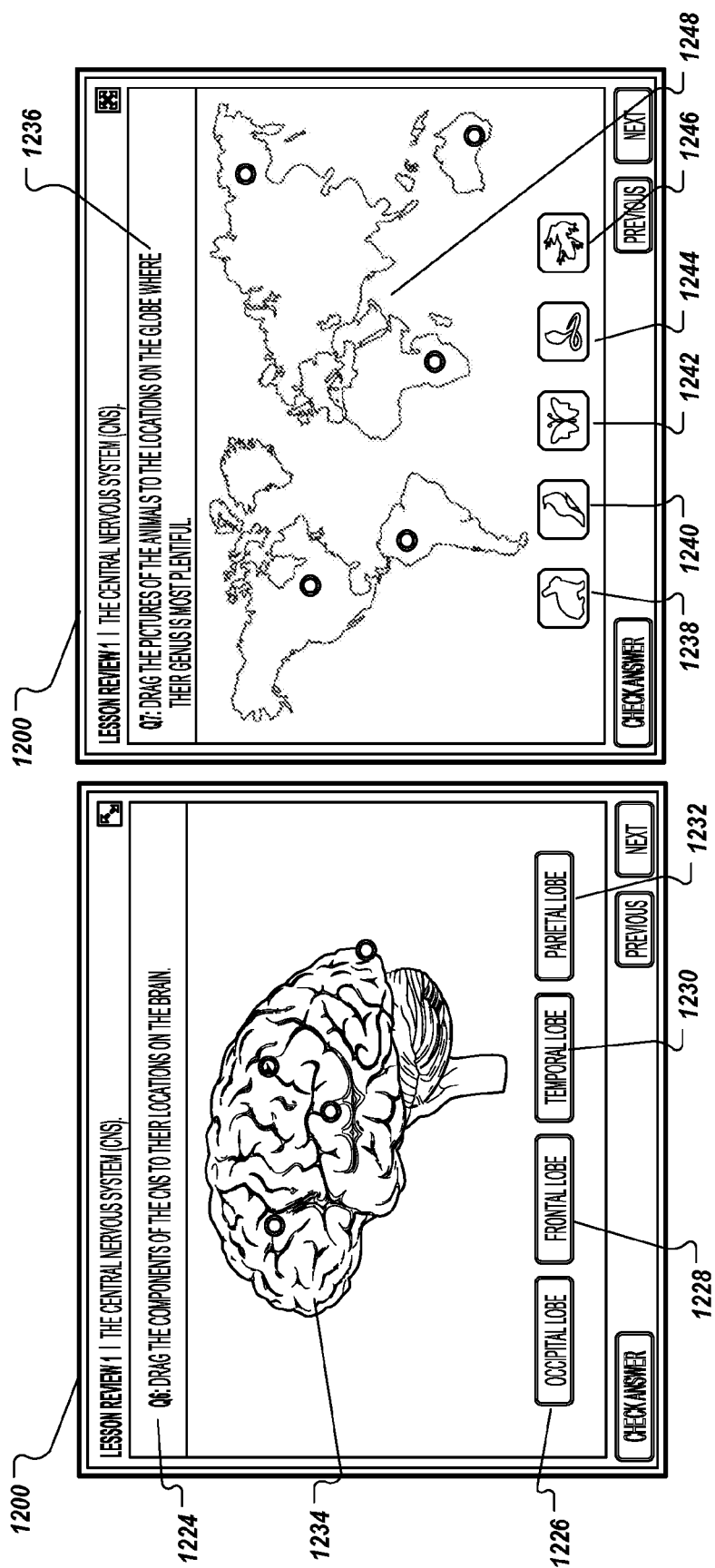

CK12 BIOLOGY - GLOSSARY

🔍 SEARCH — 1401

A  A
B  ABC MODEL
C  ABIOTIC
D  ABORTION
E  ABSCISIC ACID (ABD)
F  ABSORPTION
G  ABSORPTION SPECTRUM
H  ABYSSAL ZONE
I  ACANTHODIAN
J  ACCESSORY FRUIT
K  ACCLIMATIZATION
L  ACETYL CO A ← 1404
M  ACETYLCHOLINE
N  ACID
O  ACID PRODUCTION
P  ACID PRECIPITATION
Q  ACOELOMATE
R  ACQUIRED IMMUNITY

ACETYL COA

ACETYL COENZYME A; THE ENTRY COMPOUND FOR THE CITRIC ACID CYCLE IN CELLULAR RESPIRATION, FORMED FROM A FRAGMENT OF PYRUVATE ATTACHED TO A COENZYME, FORMED FROM A FRAGMENT OF PYRUVATE ATTACHED TO A COENZYME — 1406

$C_{23} H_{38} N_7 O_{17} P_3 S$

— 1408

RELATED GLOSSARY TERMS
ACETYLCHOLINE, ABSCISIC ACID (ABD), ACANTHODIAN, COENZYMES

TERM REFERENCES
ACETYL COENZYME A, CHAPTER 17. PAGE 1060
REGIONS OF THE BRAIN, CHAPTER 17. PAGE 1070-1090
AS NEUROTRANSMITTER, CHAPTER 17. PAGE 1050

HOW ADDICTION HAPPENS

THE NEUROBIOLOGICAL THEORY OF ADDICTION PROPOSES THAT CERTAIN CHEMICAL PATHWAYS ARE GREATLY CHANGED IN THE BRAIN OF AN ADDICTED PERSON. ALMOST ALL DRUGS THAT ARE ABUSED AFFECT A CERTAIN SET OF BRAIN STRUCTURES IN THE LIMBIC SYSTEM CALLED THE "BRAIN REWARD SYSTEM". THE NEUROTRANSMITTER DOPAMINE IS COMMONLY ASSOCIATED WITH THE BRAIN REWARD SYSTEM. THE SYSTEM PROVIDING FEELINGS OF PLEASURE (THE "REWARD"), THAT MOTIVATES A PERSON TO PERFORM CERTAIN ACTIVITIES OVER AND OVER AGAIN. DOPAMINE IS RELEASED AT SYNAPSES BY NEURONS WHEN A PERSON HAS A PLEASURABLE EXPERIENCE SUCH AS EATING A FAVORITE FOOD, OR EATING WHEN VERY HUNGRY. SUCH MECHANISMS HAVE EVOLVED TO ENSURE THE SURVIVAL OF ORGANISMS.

SOME DRUGS, SUCH AS COCAINE, NICOTINE, AMPHETAMINES, AND ALCOHOL DIRECTLY OR INDIRECTLY INCREASE THE AMOUNT OF DOPAMINE IN THE LIMBIC STRUCTURES. THE PLEASURABLE FEELINGS THAT THESE DRUGS PRODUCE TRICK THE BODY INTO THINKING THAT THE DRUG IS GOOD, IT IS IMPORTANT FOR SURVIVAL, AND NEEDS TO BE TAKEN REPEATEDLY. DRUGS THAT DIRECTLY AFFECT THE BRAIN REWARD SYSTEM ARE HIGHLY ADDICTIVE. THE STIMULANT NICOTINE, WHICH IS FOUND IN TOBACCO, IS HIGHLY ADDICTIVE. COCAINE IS AN EXAMPLE OF A PSYCHOACTIVE DRUG THAT IS BOTH USED AS A MEDICINE, AND ABUSED AS A DRUG. COCAINE IS HIGHLY ADDICTIVE. IT IS A DOPAMINE TRANSPORTER BLOCKER–IT BLOCKS THE REUPTAKE OF DOPAMINE BY THE PRESYNAPTIC NEURON.

THIS ACTION INCREASES THE AMOUNT OF DOPAMINE LEFT IN THE SYNAPTIC CLEFT, SO DOPAMINE HAS A STRONGER EFFECT ON THE POSTSYNAPTIC NEURON. CONTINUED COCAINE USE CAUSES A REDUCTION IN THE NUMBER OF DOPAMINE RECEPTORS ON THE POSTSYNAPTIC NEURON. EVENTUALLY, THE POST SYNAPTIC NEURON BECOMES UNDERSTIMULATED BECAUSE THERE ARE FEWER DOPAMINE RECEPTORS ON IT TO RESPOND TO DOPAMINE. AT THIS POINT, MORE COCAINE MUST BE TAKEN TO STIMULATE THE POSTSYNAPTIC NEURON INTO AN ACTION POTENTIAL.

TERMS FOR THE LESSON 4.1
- ABC MODEL
- ABIOTIC
- ABSCISIC ACID
- ABSORPTION
- ABSORPTION SPECTRUM
- ABYSSAL ZONE
- ACANTHODIAN
- ACCESSORY FRUIT
- ACCLIMATIZATION
- ACETYL COA
- ACID
- ACID PRECIPITATION
- ACOELOMATE
- ACQUIRED IMMUNITY
- ACTION SPECTRUM

*FIG. 17*

INTERACTIVE CONTENT FOR DIGITAL BOOKS

CROSS-REFERENCE TO RELATED APPLICATION

This application is a continuation (and claims the benefit of priority under 35 USC 120) of U.S. application Ser. No. 13/588,432, filed Aug. 17, 2012, now allowed, which claims the benefit of U.S. Provisional Application No. 61/525,698, filed on Aug. 19, 2011. The disclosure of both of these prior application are considered part of and are incorporated by reference in the disclosures of this application.

TECHNICAL FIELD

This disclosure is related generally to interactive content for digital books.

BACKGROUND

Digital books (also called e-books) can be stored on and read from a digital device such as an e-book reader, tablet computer, laptop computer or smart phone. A digital book can be purchased from an online store on the World Wide Web and downloaded to the device. The device can include buttons for scrolling through pages of the digital book. Digital books can include text and image content. Interactions between a user and digital book content are often limited to merely scrolling through text and viewing static content such as images.

SUMMARY

This disclosure describes systems, methods, and computer program products for presenting interactive content for digital books. In some implementations, a graphical user interface (GUI) is presented that allows a user to view and interact with content embedded in a digital book. The interactive content can include, but is not limited to, text, image galleries, multimedia presentations, video, hypertext markup language (HTML), animated and static diagrams, charts, tables, visual dictionaries, review questions, three-dimensional (3D) animation and any other known media content. For example, various touch gestures can be used by the user to move through images and multimedia presentations, play video, answer review questions, manipulate three-dimensional objects, and interact with HTML. The interactive content can be displayed using interactive elements that can be embedded in digital books.

Particular implementations provide one or more of the following advantages: The disclosed GUIs facilitate or accelerate data input, give the user better control over interaction with the book and provide better visual feedback to the user. The disclosed GUIs enhance the learning process by allowing a user to interact with the subject matter of the digital book, facilitating self-testing of the user's retention of the read subject matter, and providing an more interesting and engaging learning experience.

The details of the disclosed implementations are set forth in the accompanying drawings and the description below. Other features, objects, and advantages will be apparent from the description and drawings, and from the claims.

DESCRIPTION OF DRAWINGS

FIG. 3 illustrates an example graphical user interface for displaying contents of a digital book.

FIGS. 12A-12K illustrate an example review interactive element.

FIG. 14 illustrates an example interactive glossary interface.

FIG. 15 illustrates an example definition pop-over.

FIG. 16 illustrates an example search results interface.

FIG. 17 illustrates an example interface having glossary-linked terms.

The same reference symbol used in various drawings indicates like elements.

DETAILED DESCRIPTION

Table of Contents

Figure 1:
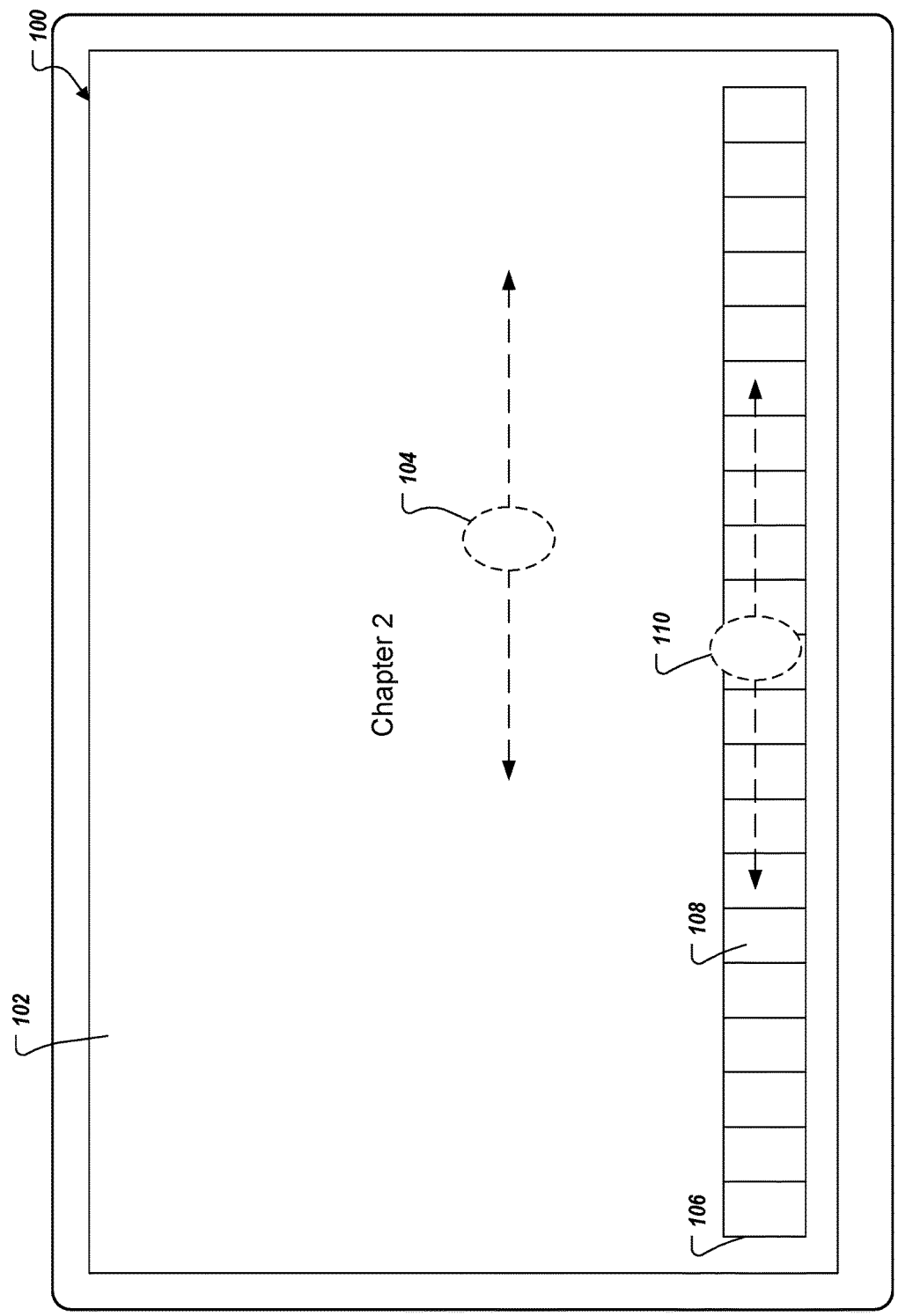
FIG. 1 illustrates an example graphical user interface (GUI) for navigating content of digital books presented in landscape mode.

FIG. 1 illustrates an example graphical user interface (GUI) 100 for navigating content of digital books presented in landscape mode. GUI 100 can be generated by a computer program (e.g., digital book application) executing on one or more processors or processing cores of a data processing apparatus, including but not limited to: laptop computers, desktop computers, tablet computers, e-book readers and smart phones.

In some implementations, the data processing apparatus (i.e., "device," "computing device," etc.) can include a touch-sensitive surface. The touch-sensitive surface can process multiple simultaneous points of input, including processing data related to the pressure, degree or position of each point of input. Such processing facilitates gestures with multiple fingers, including pinching, de-pinching and swiping. The examples that follow assume that the device hosting the digital book application includes a touch-sensitive surface for displaying GUI 100 and for receiving touch input.

GUI 100 can include an area 102 for presenting graphics representing a chapter. For example, area 102 can display photographs, drawings, animations, movies or other graphical media that an author has chosen to represent the contents of a chapter. For example, if Chapter 2 of the digital book describes the workings of the human brain, area 102 may display a photograph or drawing of a human brain. In some implementations, a user can provide input to area 102 to move between chapters of the digital book. For example, a user can provide touch input 104 to area 102 to move between chapters of the digital book. Touch input 104 can be a swipe gesture using one or more fingers to indicate which direction to move in the book. For example, a swipe to the left can cause the previous chapter (e.g., Chapter 1) of the book to be displayed in GUI 100. A swipe to the right can cause the next chapter (e.g., Chapter 3) of the book to be displayed in GUI 100.

GUI 100 can include page thumbnails 106. For example, page thumbnails 106 can display thumbnails of the pages within the currently displayed chapter. In some implementations, a user can select a particular page thumbnail (e.g., thumbnail 108) to cause the corresponding page of the chapter to be displayed. For example, the digital book can jump from GUI 100 to the page of the book corresponding to the selected thumbnail. In some implementations, a user can provide touch input 110 to page thumbnails 106 to navigate through the page thumbnails. For example, if the number of pages in a chapter is large, all of the thumbnails for the chapter may not fit on GUI 100. Thus, some of the page thumbnails may be hidden. A user can scroll through page thumbnails 106 and display hidden page thumbnails through touch input 110. Scrolling can be performed in response to receiving a touch input 110 (e.g., a swipe gesture) to page thumbnails 106. For example, a swipe left can cause the thumbnails to scroll left. Similarly, a swipe right can cause the thumbnails to scroll right.

In some implementations, a user can scroll to the next or previous chapter by scrolling page thumbnails 106. For example, if a user scrolls left past the last page of the sequence of page thumbnails 106, GUI 100 can be changed to display content associated with the next chapter (e.g., Chapter 3). Likewise, if a user scrolls right past the first page of the sequence of page thumbnails 106, GUI 100 can be changed to display content associated with the previous chapter (e.g., Chapter 1).

Figure 2:
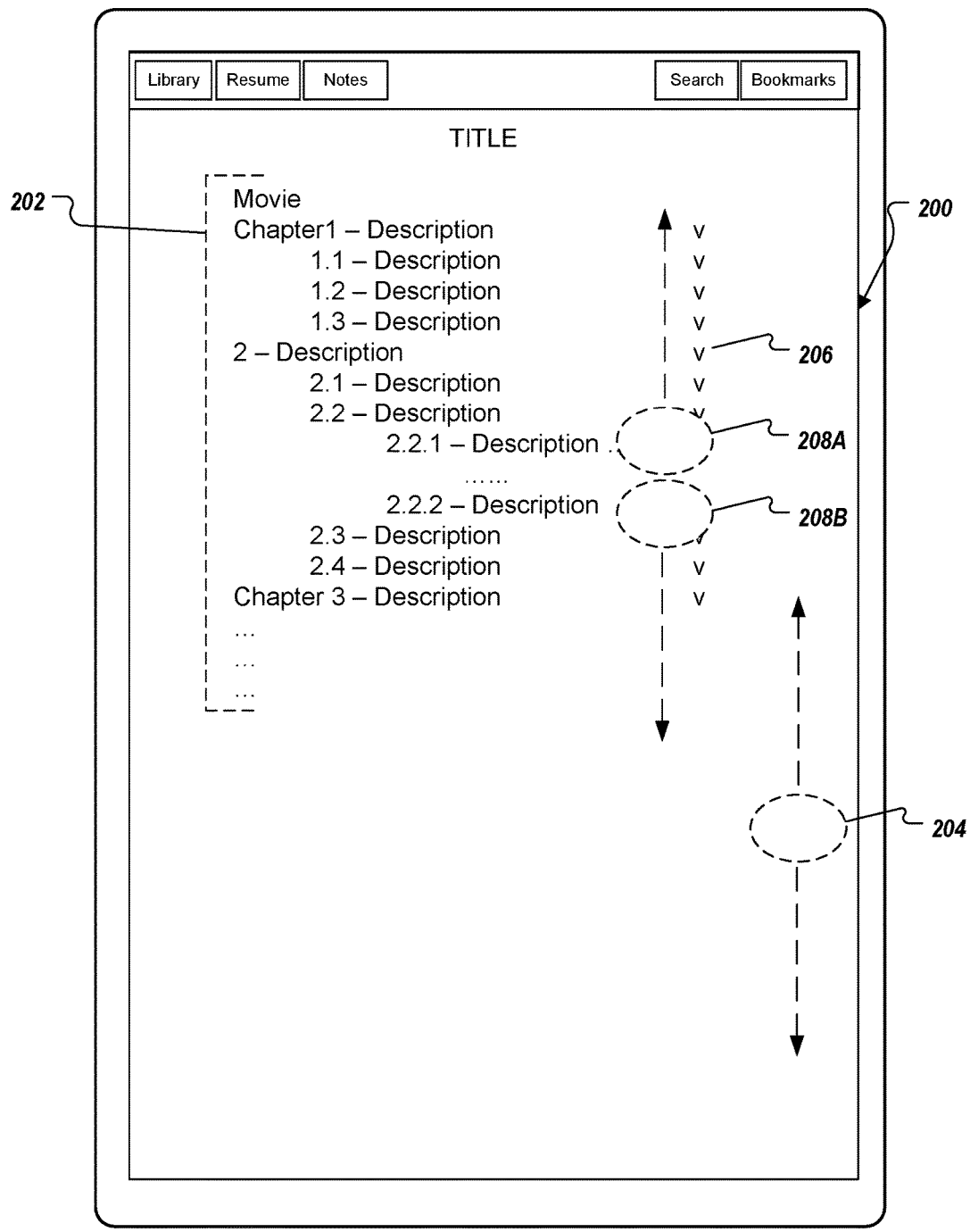
FIG. 2 illustrates an example GUI for presenting a table of contents (TOC) for digital books in portrait mode.

FIG. 2 illustrates an example GUI 200 for presenting a table of contents (TOC) 202 for digital books in portrait mode. In some implementations, the device can adjust its display based on its orientation with respect to the ground. For example, the device can detect a change in orientation and adjust its display (e.g., change how the user interface displays information) accordingly. In some implementations, the device can have a portrait orientation and a landscape orientation. For example, the display of the device can have a rectangular shape with long edges and short edges. In landscape orientation, the short edges are generally perpendicular to the ground, as illustrated by FIG. 1. In portrait orientations, the long edges are generally perpendicular to the ground, as illustrated by FIG. 2. In some implementations, when the orientation of the device is changed from landscape orientation to portrait orientation, GUI 100 changes to GUI 200.

In some implementations, TOC 202 can be manipulated by user input. For example, a user can provide input that causes TOC 202 to scroll. In some implementations, a user can provide touch input 204 to cause TOC 202 to scroll up and down. For example, a user can perform a swipe gesture 204 (touch and drag finger) to cause TOC 202 to scroll.

In some implementations, a user can select a graphical item 206 (e.g., arrow, v, button, etc.) to expand a table of contents item. For example, the TOC can be expanded to reveal chapters, sections, subtitles and/or descriptions. In some implementations, a user can provide touch input 208A, 208B to expand a table of contents item. For example, the user can provide input in the form of a de-pinch gesture (e.g., two fingers moving apart) to expand a table of contents item to reveal additional content. In some implementations, a de-pinch gesture can cause a portion of text from the body of the book to be displayed. For example, the de-pinch gesture can open a "window" that allows a user to view a portion of the text from the TOC. For example, a de-pinch gesture relative to Section 2.2.1 can cause a portion of text from Section 2.2.1 to be displayed in the table of contents. The table of contents can be adjusted (e.g., expanded) to accommodate the portion of text. In some implementations, a de-pinch gesture can cause the table of contents to be hidden and a section of the digital book to be displayed. For example, a de-pinch gesture relative to Section 2.2.1 can cause the digital book application to hide TOC 202 and to jump to Section 2.2.1.

In some implementations, the digital book application can differentiate between big and small de-pinch gestures. For example, a small de-pinch gesture (e.g., the fingers move less than a threshold distance apart) can cause only a portion of the section to be displayed inline the TOC 202. A large de-pinch gesture (e.g., the fingers move greater than a threshold distance apart) can cause TOC 202 to be hidden and the section of the digital book associated with the de-pinch gesture to be displayed. For example, the digital book application can jump from the TOC to the section in the body of the book in response to receiving a large de-pinch gesture.

FIG. 3 illustrates an example graphical user interface 300 for displaying contents of a digital book. For example, GUI 300 can display text and/or media from the body of a digital book. In some implementations, a user can provide input to GUI 300 that causes the digital book application to jump from a location in the body of a digital book to TOC 202. For example, a user can provide touch gesture input in the form of a pinch gesture 302A, 302B. The pinch gesture input can be provided relative to a section of the book (e.g., Section 2.2.1) displayed on GUI 300. In some implementations, when the pinch gesture is received, the digital book application can display the section of TOC 202 corresponding to the section associated with the pinch gesture received by GUI 300. For example, if GUI 300 is displaying content for Section 2.2.1 from the body of the digital book and a pinch gesture is received in or relative to a portion of Section 2.2.1, the digital book application can open TOC 202 at Section 2.2.1. Thus, a user can move back and forth between the table of contents and the body of the digital book by providing de-pinch and pinch gesture input in the table of contents and the body of the book.

Highlighting Interactions

Figure 4A:
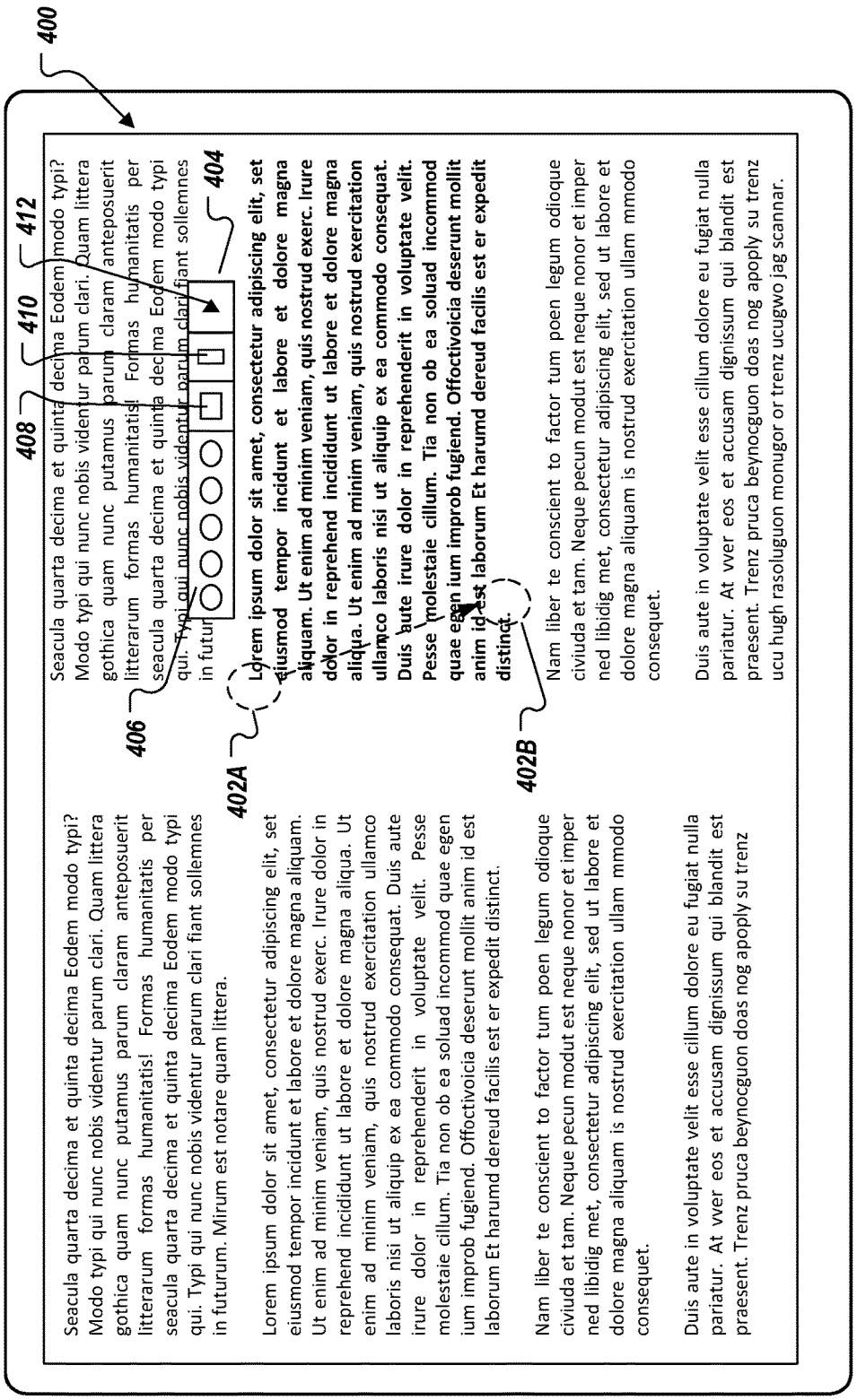
FIGS. 4A and 4B illustrate example user interfaces for interacting with textual content in a digital book.
Figure 4B:
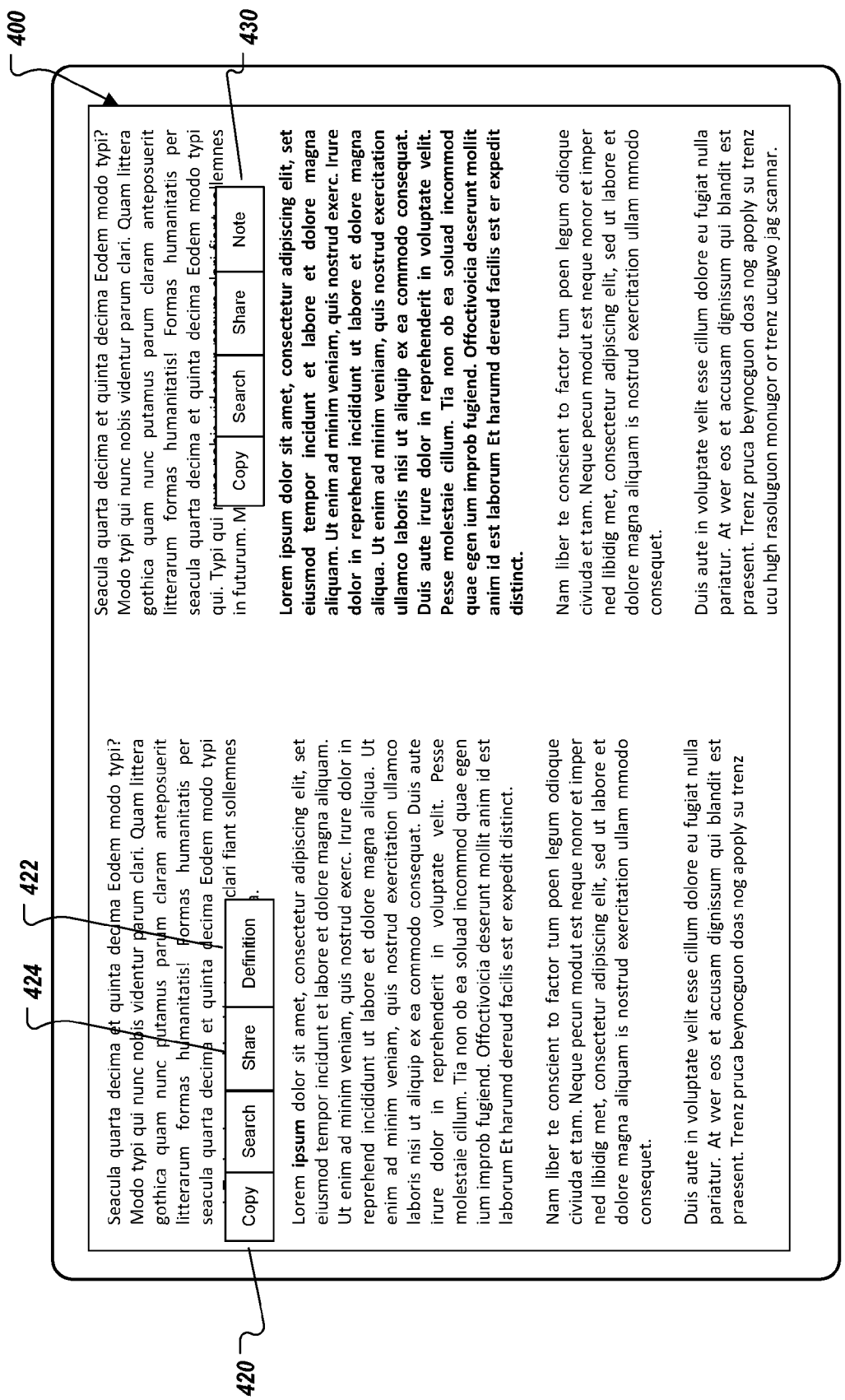

FIGS. 4A and 4B illustrate example user interfaces for interacting with textual content in a digital book. FIG. 4A illustrates highlighting a portion of text in a digital book. For example, a user can highlight a word, words, sentences and paragraphs of a digital book. In some implementations, a user can provide touch input 402A, 402B to GUI 400 to select portions of a digital book. For example, a user can touch a location 402A in a book with his or her finger for a threshold period (e.g., 120 ms) of time to enable highlighting. Once highlighting is enabled, the user can drag her finger from the location 402A to another location 402B to indicate a portion of the text of the digital book to select. For example, the user can drag her finger from the beginning of a sentence to the end of the sentence to select the sentence. In some implementations, a magnifying loupe can be displayed to assist the user in selecting locations and text.

In some implementations, a user can provide input (e.g., touch input) to the selected portion of the digital book through interface 400 to invoke heads-up-display (HUD) 404. HUD 404 can include graphical elements (e.g., circles 406) that a user can select to indicate a color for highlighting the selected portion of text. Each circle 406 can correspond to a different color for highlighting text. For example, the user can highlight different portions of text with different colors by selecting a color from HUD 404. In some implementations, the selected highlight color can be used to categorize the highlighted text. For example, the digital book application can provide an interface that allows the user to review highlighted portions of text. In some implementations, the user can filter the displayed highlighted portions of text based on the color used to highlight the text. For example, the user can indicate that she only wants to see text that was highlighted in red and the digital book application will only display red highlighted text for the user to review. In some implementations, HUD 404 can be invoked by selecting an already highlighted portion of text.

In some implementations, a user can create and save a note associated with the selected portion of text by selecting HUD item 408. In some implementations, when the user selects HUD item 408, a virtual keyboard can be displayed so that a user can annotate the selected or highlighted portion of text. A pop-up note input screen can be displayed to receive and display text. In some implementations, an annotated portion of text can be indicated by a note icon (not shown) proximate to the annotated portion of text.

In some implementations, a user can select HUD item 410 to remove highlighting from a selected portion of text. In some implementations, a user can select graphical element 412 to display additional HUD items. For example, a selection of graphical element 412 can cause the digital book application to display HUD 420 or HUD 430 of FIG. 4B. In some implementations, HUD 420 and/or HUD 430 can be invoked by selecting an already highlighted portion of text.

Figure 15:
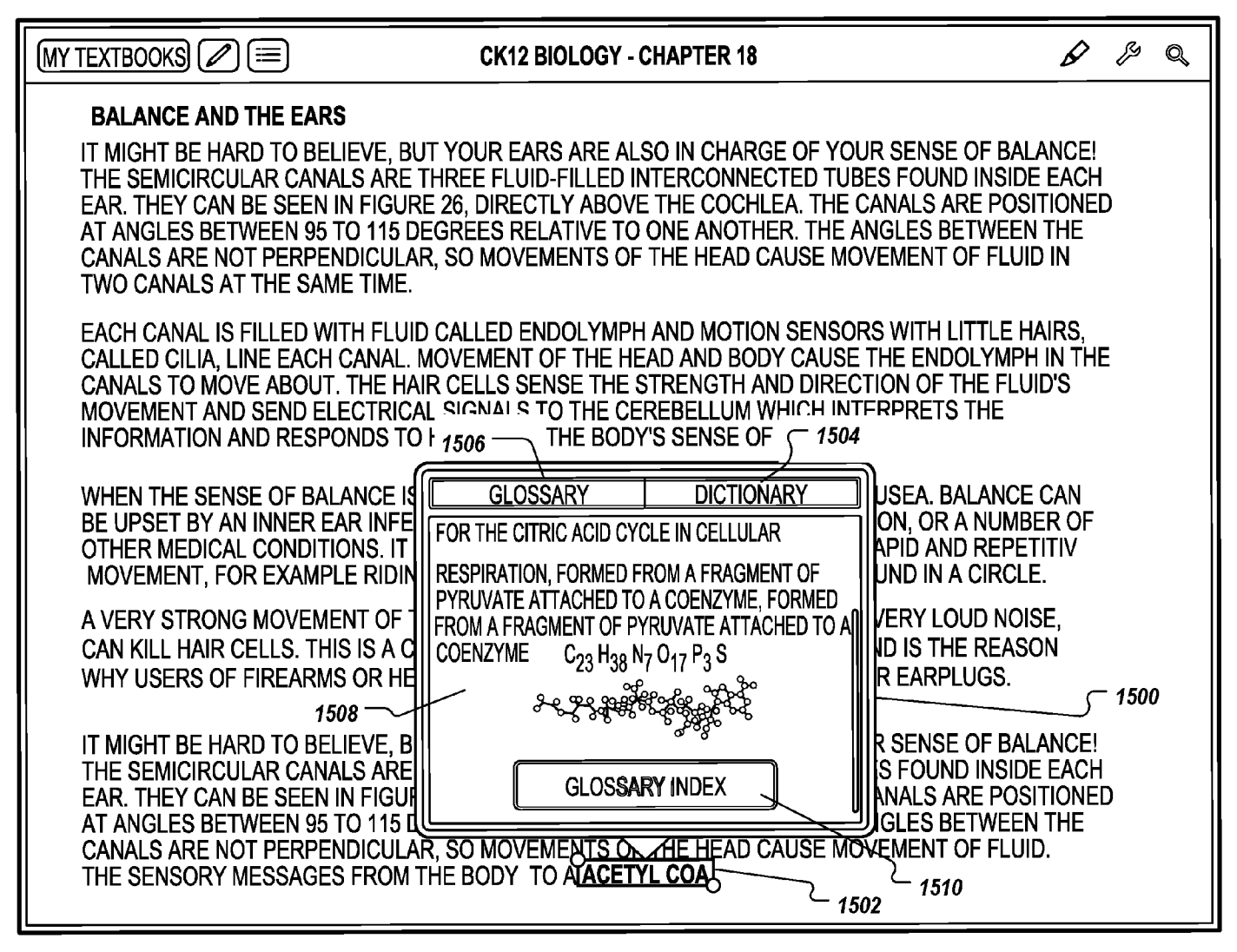

FIG. 4B illustrates interfaces for manipulating selected or highlighted text. For example, HUD 420 and HUD 430 illustrate different HUD items that can be displayed on interface 400. In some implementations, when a user has selected or highlighted three words or less, a definition HUD item 422 can be displayed to allow the user to view the definition of the word, phrase or term. If more than three words are selected, definition HUD item 422 may not be available, as illustrated by HUD 430. If a user selects definition HUD item 422 the user can be presented with an interface that displays glossary and/or dictionary definitions of the highlighted word or phrase, as illustrated by FIGS. 14-15.

In some implementations, HUD 420 and/or HUD 430 can include a share HUD item 424. When selected, share HUD item 424 can invoke an interface that allows a user to e-mail the selected text or copy a citation for the location of the selected text so that the text can be shared with another user. For example, selection of HUD item 424 can cause a popup interface to be displayed that allows the user to select between e-mail and copy location options.

Embedded Interactive Elements

As used herein, an interactive element is a container for presenting rich media, such as digital images, movies, animated diagrams and slide presentations. A container is a class whose instances are collections of other objects, and can be used to store objects in an organized way following specific access rules. An interactive element can also be referred to herein as a "widget."

Figure 5:
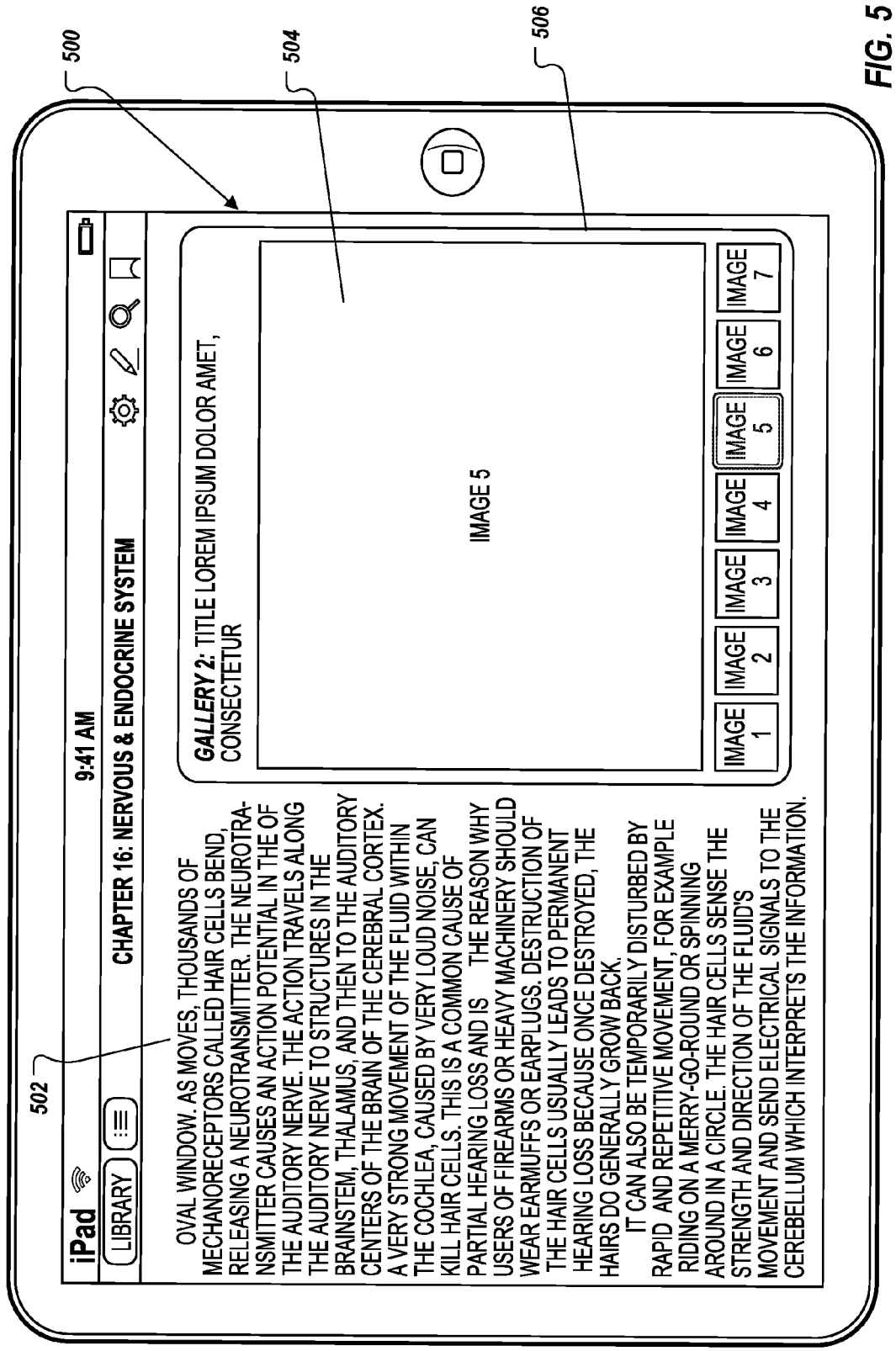
FIG. 5 illustrates an example user interface for presenting an embedded interactive element in landscape orientation.

FIG. 5 illustrates an example user interface 500 for presenting an embedded interactive element 506 in landscape orientation. In some implementations, interactive elements can be embedded in-line with text in the body of a digital book. For example, graphical user interface 500 can include text 502 and a interactive element 506 for presenting rich media (e.g., image 504). The interactive element can be presented in-line with the text such that the text flows around the interactive element. For example, the interactive element can be embedded within a column of text. Another example of an inline interactive element can be seen in FIG. 9. In some implementations, interactive elements can be embedded within text when the device is in landscape orientation. For example, when the device is in landscape orientation, the content of the book can be presented as pages that can be turned or manipulated to emulate the characteristics of a physical book. For example, a user can perform a swipe gesture (e.g., slide a finger over the display) to turn to the next page or the previous page. The interactive elements can be embedded inline in the pages of text.

Figure 6:
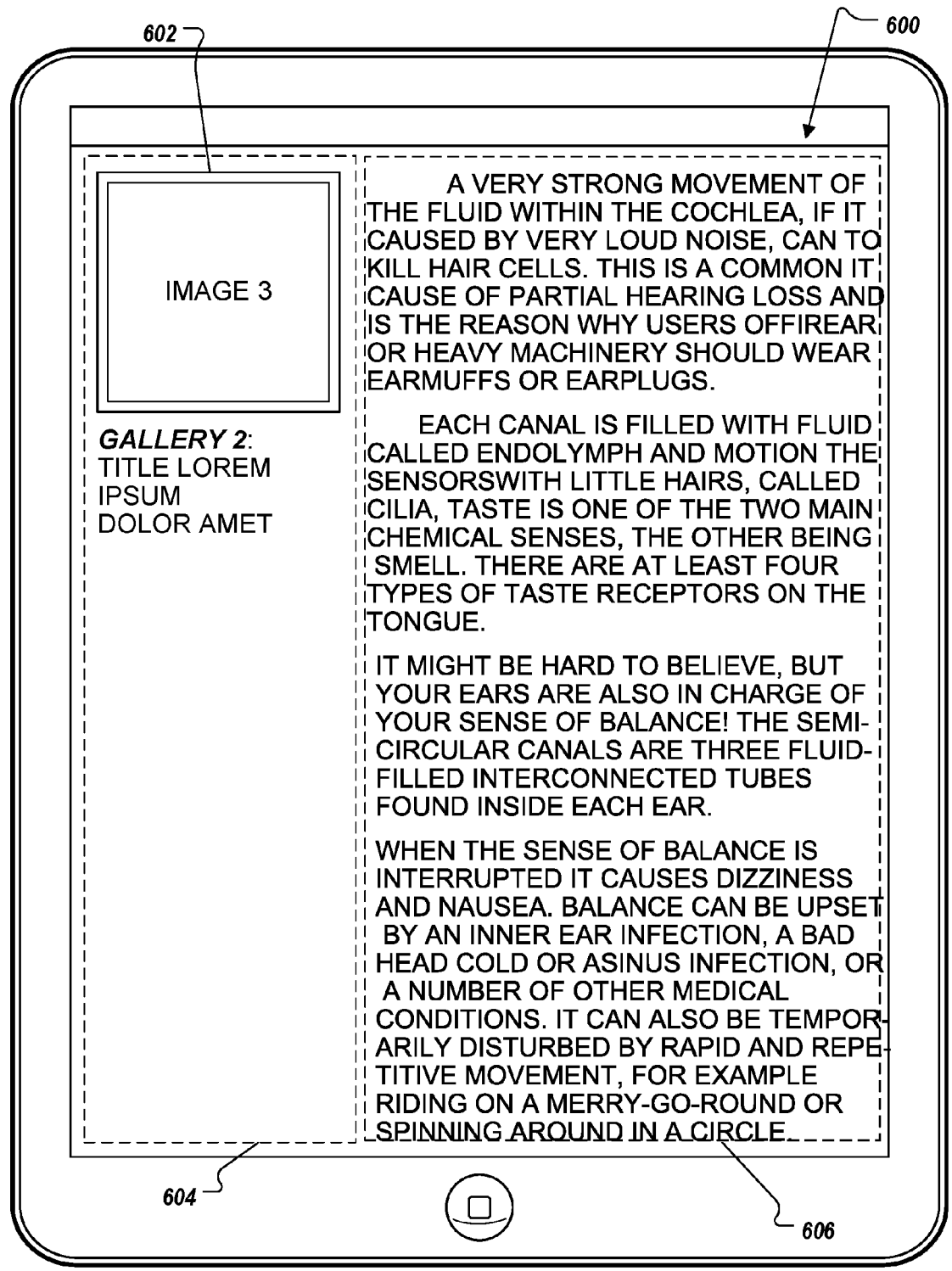
FIG. 6 illustrates an example user interface for presenting an embedded interactive element in portrait orientation.

FIG. 6 illustrates an example user interface 600 for presenting an embedded interactive element 602 in portrait orientation. In some implementations, when the device is in portrait orientation, the textual content of the book and interactive element containing rich media content can be presented in different portions of user interface 600. For example, interactive element 602 can be displayed in area 604 and the textual content can be displayed in area 606. Thus, the interactive elements in portrait orientation are not embedded in-line with the text. For example, the interactive elements and the text occupy different columns within user interface 600. In some implementations, when a user changes the orientation of the device (e.g., landscape to portrait, portrait to landscape) the presentation of the textual and media content of the digital book will automatically change according to the landscape and portrait content displays described with reference to FIG. 5 and FIG. 6.

In some implementations, interactive elements embedded in a digital book can be manipulated by user input. For example, a user can interact with a interactive element by providing touch input to the interactive element. In some implementations, a user can perform a de-pinch gesture to enlarge a interactive element to provide a full-screen view of the rich media content of the interactive element. In some implementations, the user can select a graphical object (e.g. a button) associated with the interactive element to cause the interactive element to expand to full-screen view. In some implementations, when a interactive element is in full-screen mode, a user can provide a pinch gesture as input to return the digital book to reading mode (text display), as illustrated by FIG. 5 and FIG. 6. In some implementations, a user can select a graphical object on the interactive element to return a full-screen interactive element to reading mode. FIGS. 5 and 6 illustrate a gallery interactive element (below) in reading mode.

Gallery Interactive Element

Figure 7:
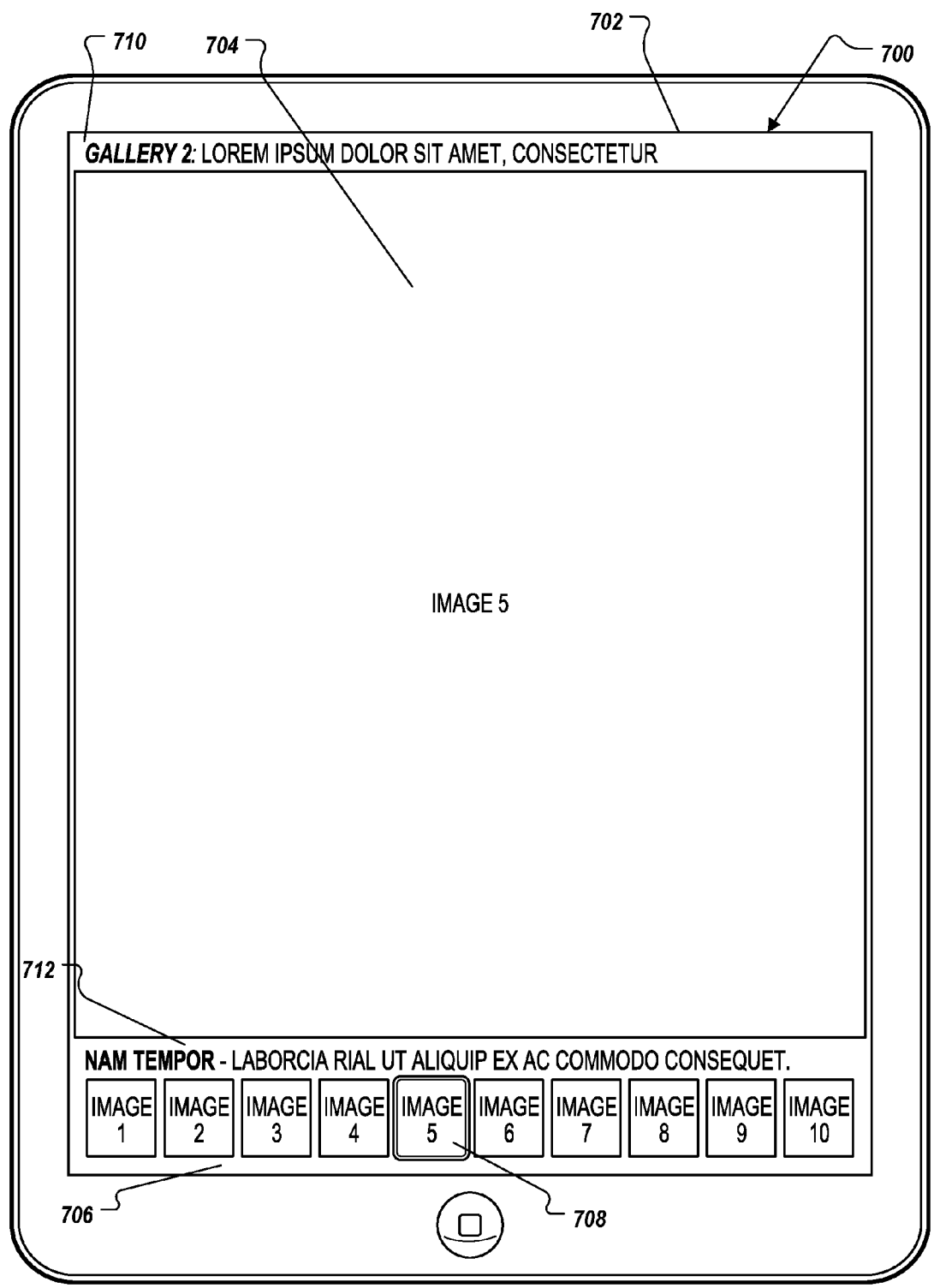
FIG. 7 illustrates an example user interface for presenting a gallery interactive element in full-screen mode and portrait orientation.

FIG. 7 illustrates an example user interface 700 for presenting a gallery interactive element 702 in full-screen mode and portrait orientation. In some implementations, a user can provide input to gallery interactive element 504 and/or gallery interactive element 602 to cause the gallery interactive element to be displayed in full-screen mode. For example, a user can perform a de-pinch operation over gallery interactive element 504 and/or gallery interactive element 602 to cause the interactive element to expand to full screen. In some implementations, a graphical object is provided proximate to a interactive element that when selected causes the interactive element to expand to full screen.

In some implementations, a gallery interactive element can display images. For example, a gallery interactive element can be configured to display a collection of images identified or provided by an author of a digital book. Graphical user interface 700 displays a gallery interactive element 702. The gallery interactive element includes an area 704 for displaying a currently selected image from the gallery. The gallery interactive element includes thumbnail images 706 of the images associated with the gallery interactive element. In some implementations, a user can select a thumbnail image to cause the selected image to be displayed in main image area 704. For example, a user can select thumbnail image 708 to cause the image corresponding to the thumbnail image to be displayed enlarged in main image area 704. In some implementations, the currently selected thumbnail image can be highlighted to indicate that it is the currently displayed image. In some implementations, the gallery interactive element 702 can include label and enumeration 710. For example, the label can describe the gallery and the enumeration can identify (e.g., by number) the gallery relative to other galleries in the digital book. In some implementations, gallery interactive element 702 can display a caption 712 for the currently selected image.

Figure 8:
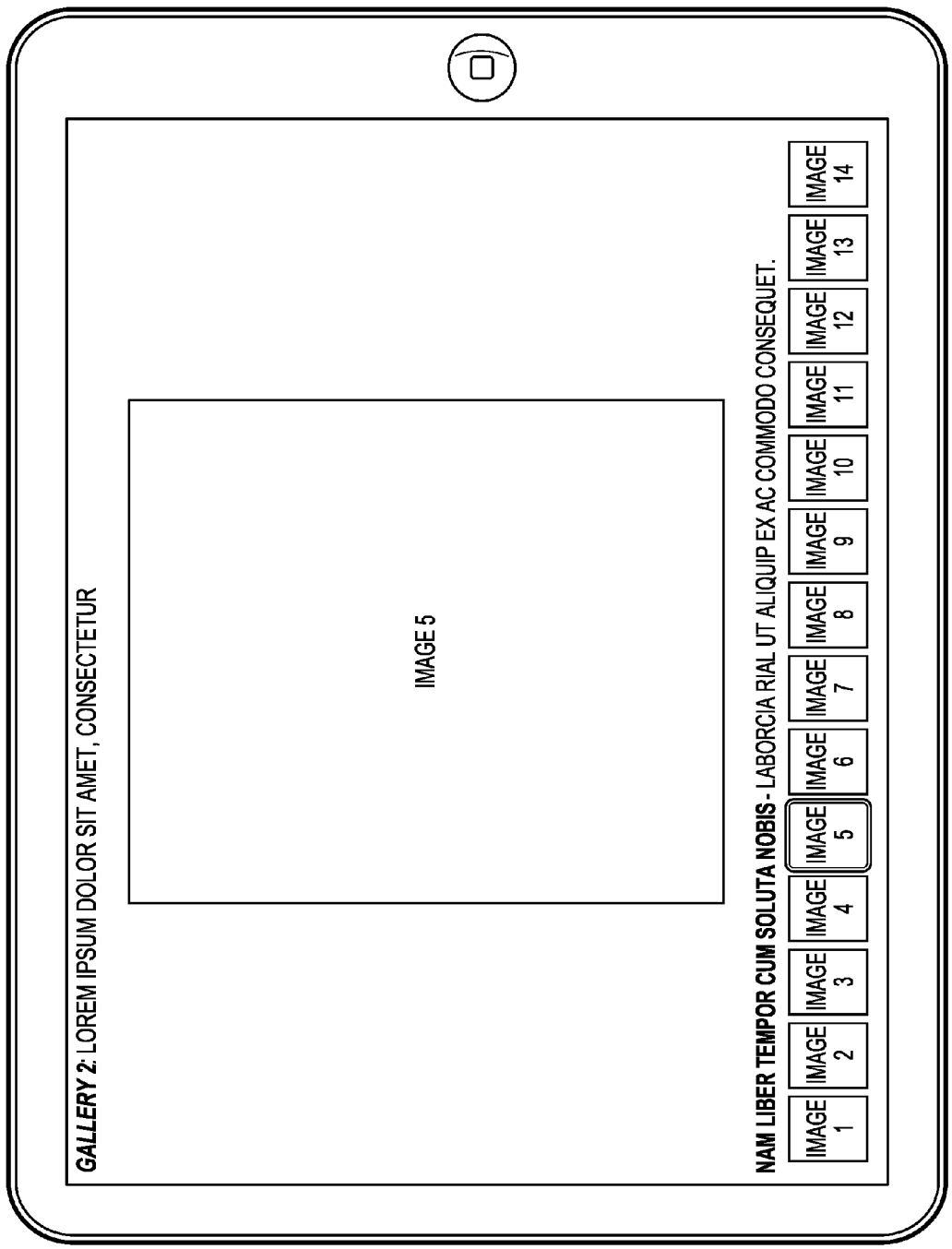
FIG. 8 illustrates an example user interface for presenting a gallery interactive element in full-screen mode and landscape orientation.

FIG. 8 illustrates an example user interface for presenting a gallery interactive element in full-screen mode and landscape orientation. The gallery interactive element of FIG. 8 has the same functionality as the gallery interactive element described in FIG. 7, above. In some implementations, a user can perform a pinch gesture (touch input) over a interactive element (e.g., gallery interactive element 702) to exit full-screen mode and return to the text of the digital book (e.g., reading mode, FIGS. 5 and 6). In some implementations, a user can manipulate the gallery interactive element when in reading mode. For example, the user cause different gallery images to be displayed as the main image by selecting thumbnail images in the manner described above. In some implementations, the functionality, behaviors and interactions provided by interactive elements and described herein can be available to a user in both full-screen and reading modes.

Slide Show Interactive Element

Figure 9:
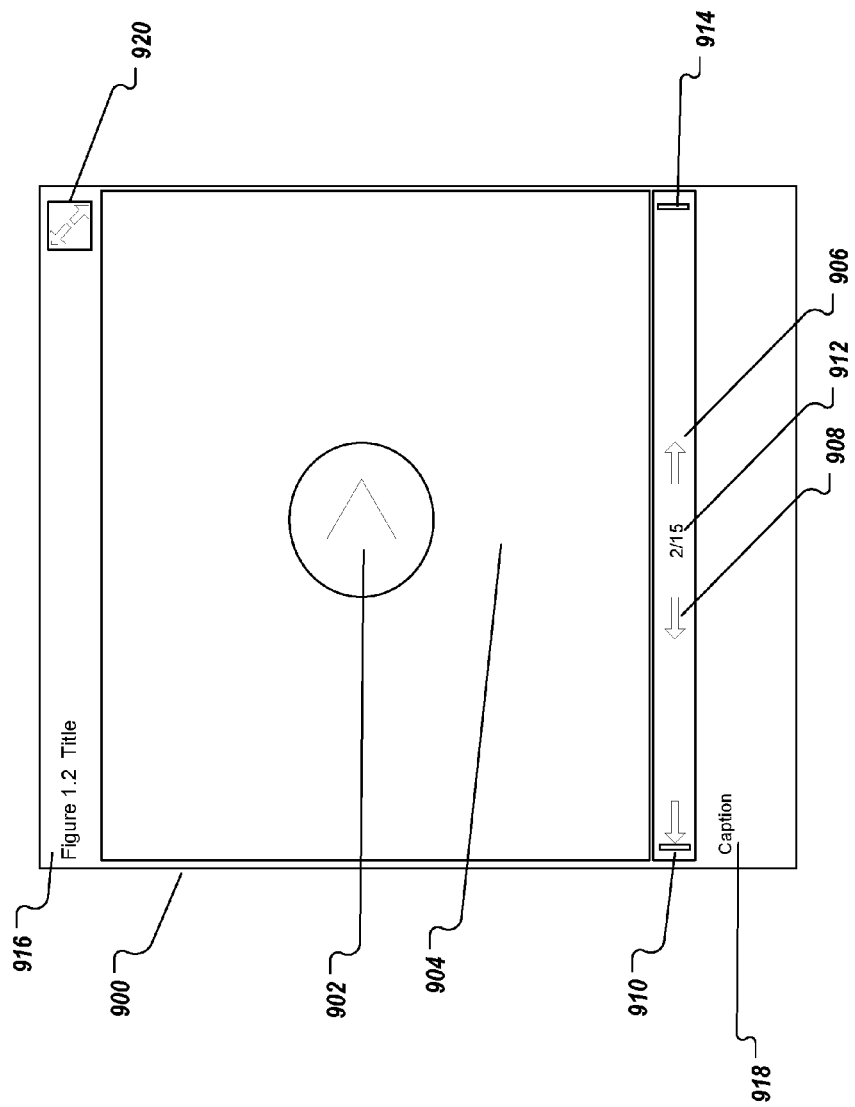
FIG. 9 illustrates an example slide show interactive element.

FIG. 9 illustrates an example slide show interactive element 900. In some implementations, slide show interactive element, or presentation interactive element, 900 can be embedded in a digital book in the same manner described above for the gallery interactive element of FIGS. 5 and 6. In some implementations, slide show interactive element can include slides for presenting content (e.g., images, sounds, text, drawings, figures, flow charts, organizational charts, bullet point slides, etc.). A user can view the slides in slide show interactive element 900 in place in reading mode or the user can view the slides with the slide show interactive element in full-screen mode. In some implementations, the user can view the slides in slide show interactive element 900 by selecting interface element 902. For example, user interface element 902 can be a play button that causes the slide show interactive element to automatically display each slide in the slide show in sequence without further user input. The slides can be timed such that each slide is displayed for a specified period of time before the slide show interactive element displays the next slide. The current slide in the slide show can be displayed in display area 904.

In some implementations, a user can indicate when the next slide should be shown. For example, a user can manually navigate the slides by selecting graphical element 906 to cause the next slide in the slide show to be displayed. A user can select graphical element 908 to cause the previous slide in the slide show to be displayed. In some implementations, a user can provide a touch gesture as input to slide show interactive element 900 to display slides in the slide show. For example, a user can perform a swipe gesture to cause the next slide (e.g., swipe left) or the previous slide (e.g., swipe right) to be displayed. A user can perform a tap gesture to cause the next slide to be displayed. A user can select graphical element 910 to cause the first slide in the slide show to be displayed. For example, selecting graphical element 910 can cause slide show interactive element 900 to display the first slide in the sequence of slides associated with slide show interactive element 900. Slide show interactive element 900 can also include slide number indicator 912 that indicates which slide in the sequence of slides is currently displayed.

In some implementations, slide show interactive element 900 can include slides that have sound. Thus, slide show interactive element 900 can include an audio control element 914 that allows a user to adjust the sound output from slide show interactive element 900. Slide show interactive element 900 can include label 916 and caption 918. For example, caption 918 can display a description for the currently displayed slide. Label 916 can be a label for the slide show interactive element. In some implementations, a user can select graphical element 920 to cause slide show interactive element 900 to be displayed in full screen mode.

Three-Dimensional Interactive Element

Figure 10:
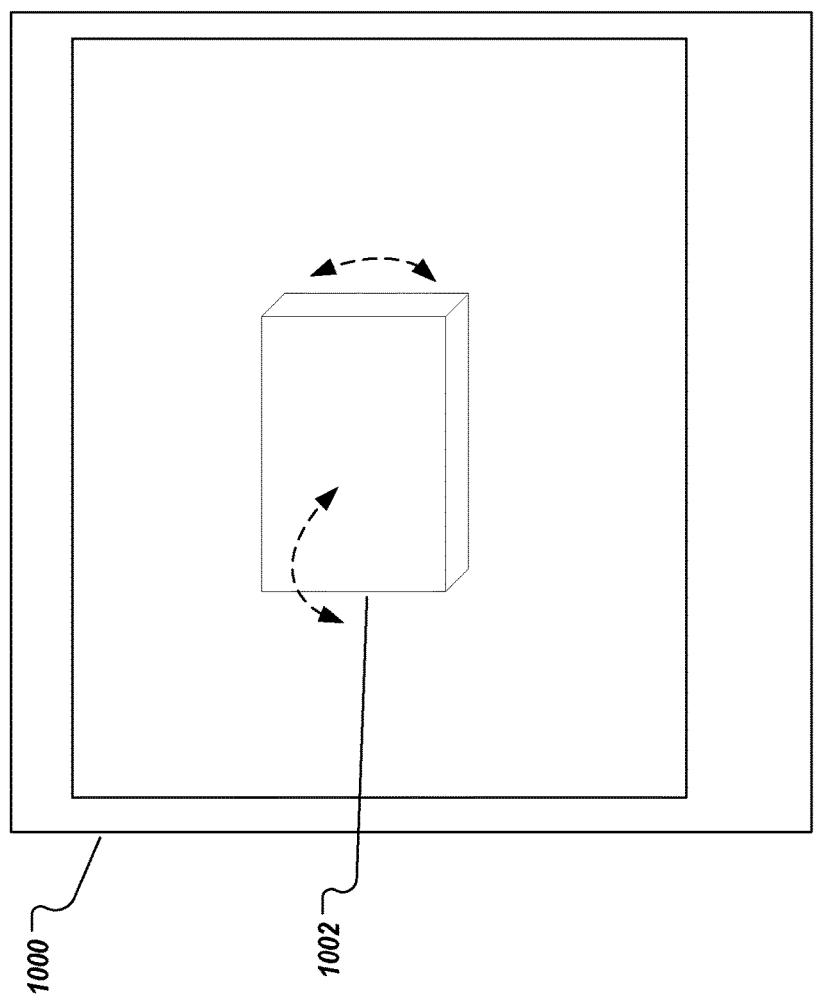
FIG. 10 illustrates an example three-dimensional interactive element.

FIG. 10 illustrates an example three-dimensional interactive element 1000. In some implementations, three-dimensional interactive element 1000 (e.g., multi-dimensional interactive element) can display a manipulable perspective view representation of object (e.g., a three-dimensional, multi-dimensional image). For example, three-dimensional interactive element 1000 can display a representation of a three-dimensional object 1002 that can be rotated and otherwise manipulated by a user. For example, the user can provide touch input (e.g., swipe, pinch, rotate, etc.) to cause the three-dimensional object to spin, enlarge, shrink, rotate and change perspective. The three-dimensional image of the object can be animated to appear to spin, rotate, etc. The three-dimensional object can be a three-dimensional model (e.g., Collada three-dimensional model) that allows the user to view the object from different perspectives and in different levels of detail. Like all of the interactive elements described herein, the three-dimensional interactive element can be displayed in full-screen mode, reading mode, landscape and portrait orientations, as illustrated by FIGS. 5-8.

Media Interactive Element

Figure 11A:
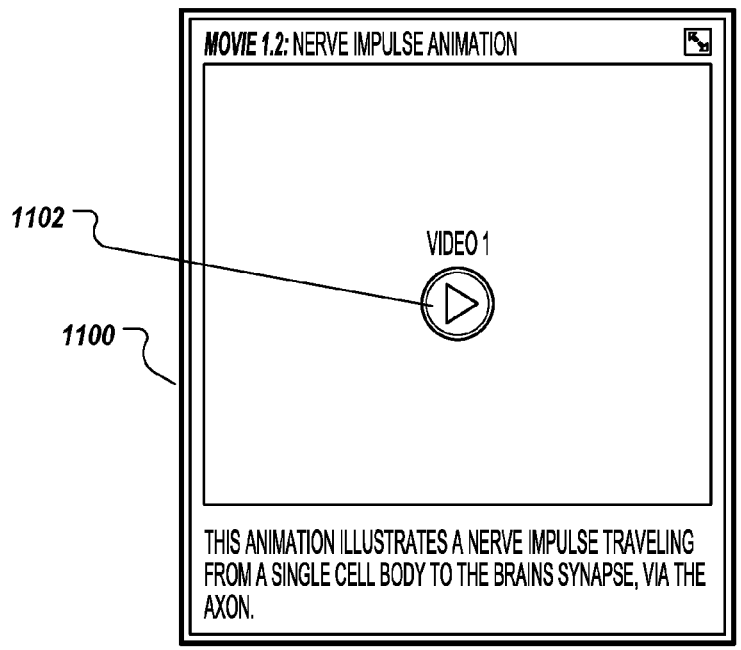
FIGS. 11A and 11B illustrate an example media interactive element.
Figure 11B:
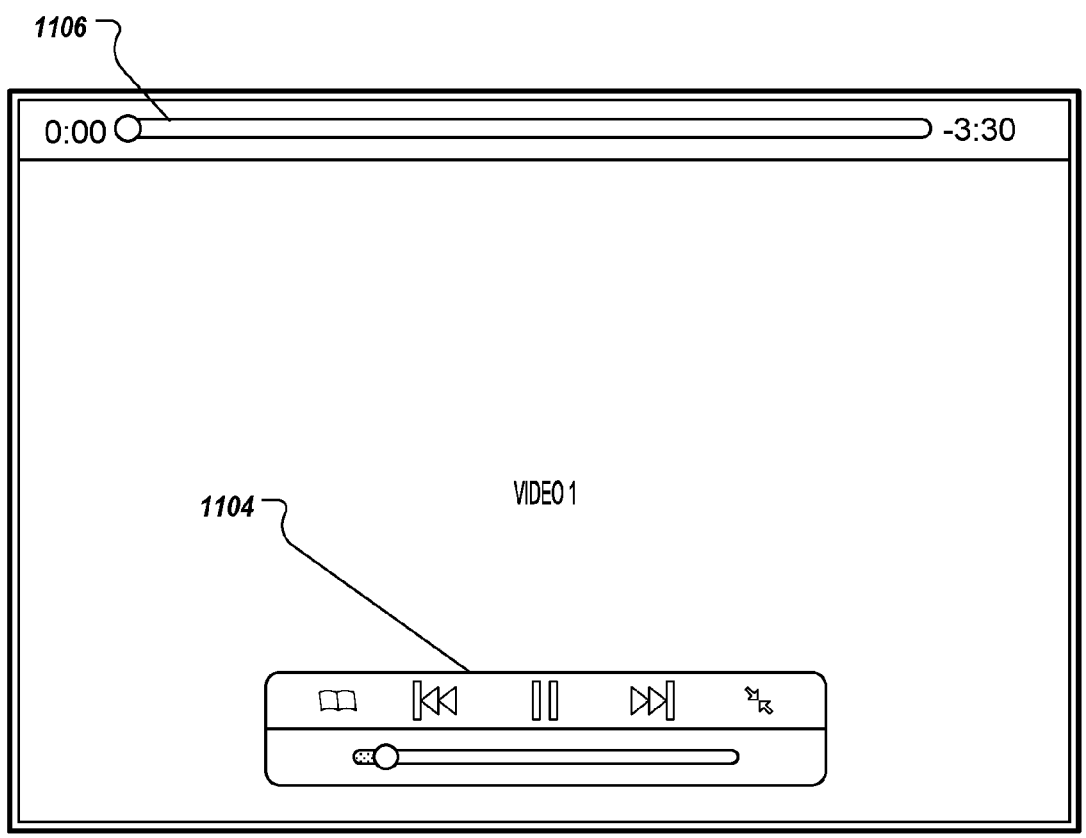

FIGS. 11A and 11B illustrate an example media interactive element 1100. In some implementations, media interactive element 1100 can be embedded into a digital book. For example, the media interactive element can present video content and/or animation content relevant to the textual content in the digital book. The media interactive element can play audio content (e.g., music, voice recordings, etc.). The media interactive element can play media content in-line in reading mode and/or can play media content in full-screen mode, landscape and portrait orientations. To play a media, a user can select graphical element 1102. Once the media is playing, media player controls 1104 and 1106 can be displayed. For example, controls 1104 can allow a user to play, pause, advance, rewind, adjust volume, and switch between full screen mode and reading mode. Control 1106 can indicate the current position in the media, the elapsed time and the time remaining. Control 1106 can allow the user to manipulate a "scrubber" that allows the user to move to a different position in the media. For example, the user can drag the scrubber handle (e.g., circle) to another location on the timeline represented by control 1106 to cause the media to play from the other location.

Review Interactive Element

FIGS. 12A-12K illustrate an example review interactive element 1200. In some implementations, review interactive element 1200 can include multiple pages of review questions. For example, each page can present a different type of question, as illustrated by FIGS. 12A-12K. In some implementations, a user can navigate through the pages of the review interactive element by selecting graphical elements 1202-1206. For example, selecting graphical element 1202 can cause the next page of the review interactive element to display (e.g., display the next question). Selecting graphical element 1204 can cause the previous page of the review interactive element to display (e.g., display the previous question). Selecting graphical element 1206 can cause review interactive element 1200 to indicate to the user that the user has selected the correct answer, which answer is the correct answer, or that the user has selected the wrong answer. For example, a visual indicator can be displayed to indicate whether the user-selected answer is correct or incorrect. Graphical element 1206 may only be available for selection after a user has already selected an answer for the current page or question.

FIGS. 12A-12C illustrate example multiple choice question formats. FIG. 12A illustrates a text-only multiple choice question format. For example, a user can read question 1208 and select the correct answer to question 1208 from the answers 1210. FIG. 12B illustrates a multiple choice format with a reference image 1212. For example, the image can be placed to the right, left, top or bottom of the answer list. The answer list can be arranged in any format (e.g., horizontal, vertical, tabular, etc.). FIG. 12C illustrates an image-selection multiple-choice format. For example, a user can select one of the images 1214-1220 as an answer to the question 1222.

FIG. 12D illustrates an example matching question format. For example, a user can respond to prompt 1224 by dragging and dropping labels 1226-1232 onto the appropriate positions on image 1234. Similar to FIG. 12D, FIG. 12E illustrates an example matching question format. For example, a user can respond to prompt 1236 by dragging images 1238-1246 onto the appropriate positions on image 1248.

Figures 12F, 12G, 12H:
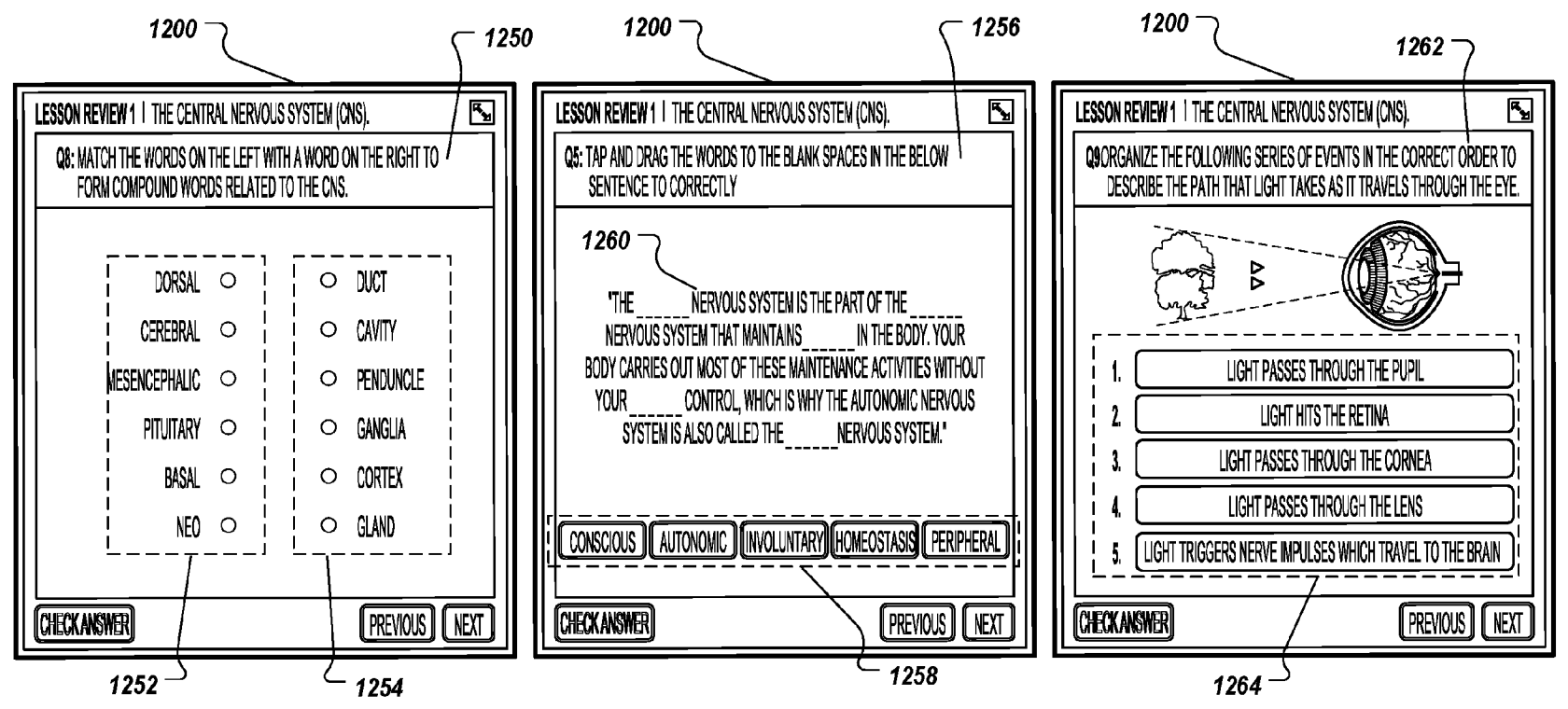

FIG. 12F illustrates an example matching question format. For example, a user can respond to prompt 1250 by matching a term in column 1252 to a term in column 1254. FIG. 12G illustrates an example fill-in the blanks question format. For example, a user can respond to prompt 1256 by dragging each of the terms in term list 1258 to the appropriate blank space in text 1260. FIG. 12H illustrates an example order list question format. For example, a user can respond to prompt 1262 by arranging the items in list 1264 in the correct order.

Figure 12I:
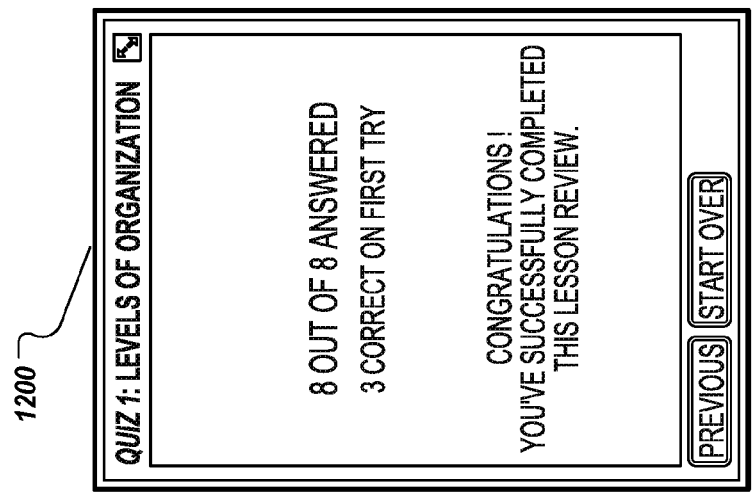
Figure 12J:
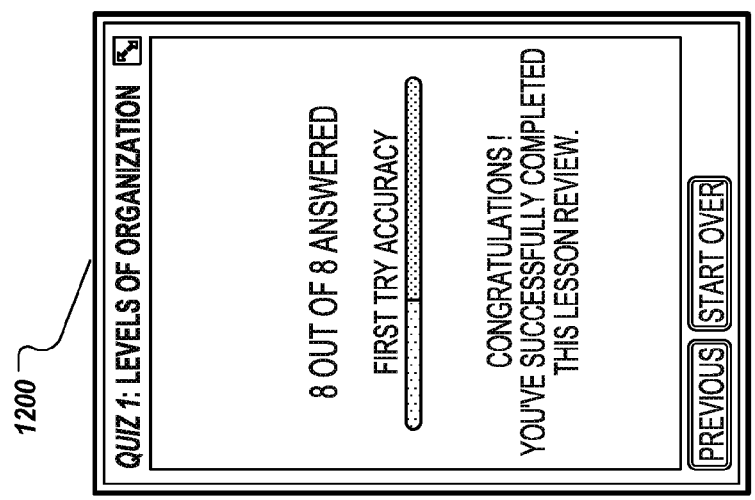
Figure 12K:
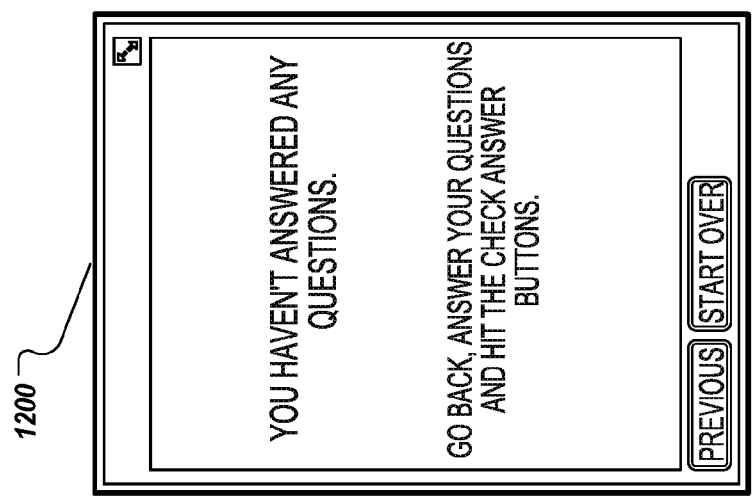

FIGS. 12I-12K illustrate example summary pages. For example, once the user has answered some or all of the questions in the review interactive element, the summary pages 12I and 12J can be displayed to show the user how many questions that the user answered correctly. For example, if the user has answered at least some questions, the summary page can display how many questions were answered correctly, a ratio of correct to incorrect answers, how many questions were correctly answered on the first try, and/or any other metric that may be useful for the user to determine how well she knows the materials covered in a section of the digital book. If the user proceeds to the summary page without answering any questions, the summary page can display the summary page of 12J that indicates that the user did not answer any questions.

Visual Dictionary Interactive Element

Figure 13B:
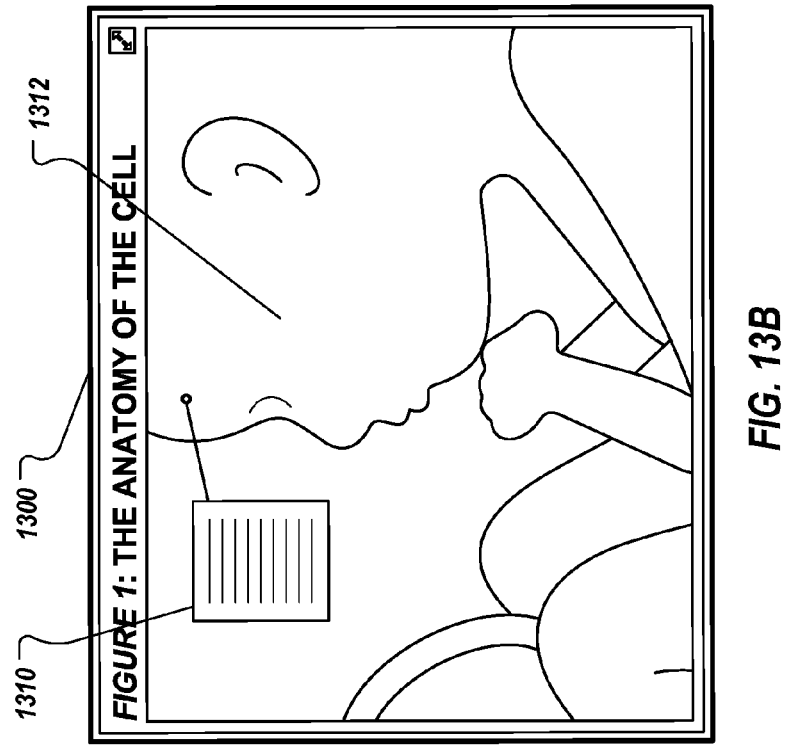
FIGS. 13A-13E illustrate an example visual dictionary interactive element.
Figure 13A:
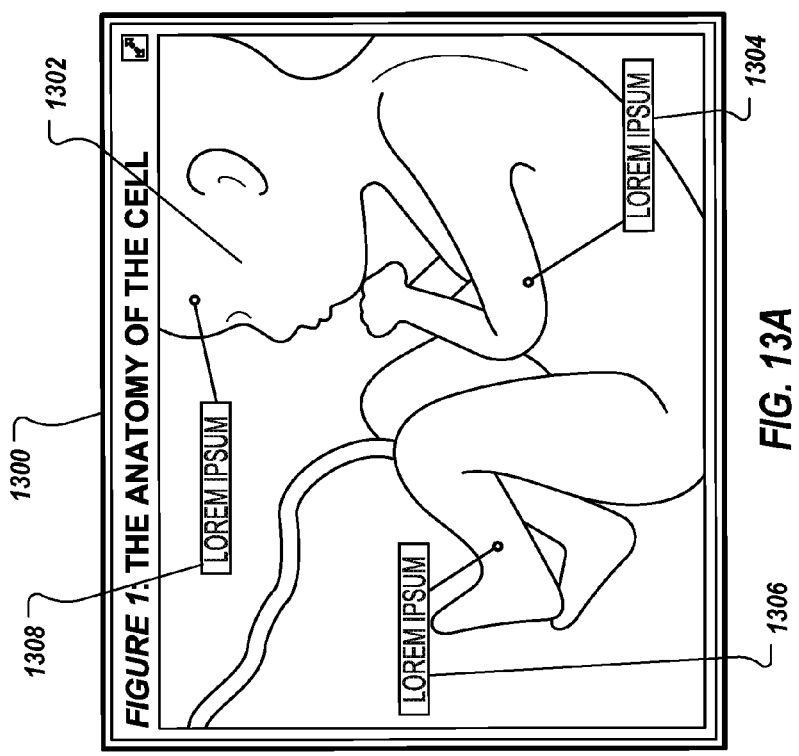

FIGS. 13A-13F illustrate an example visual dictionary interactive element 1300. In some implementations, visual dictionary interactive element 1300 can display an image 1302 and terms 1304-1308 associated with the image. A user can select a term, or an image location associated with the term, to view a definition or description of the term, as illustrated in FIG. 13B. For example, a user can select the baby's head in the image, or select term 1308, to cause term 1308 to expand and to display the definition 1310 of term 1308. When the baby's head, or term 1308, is selected, the visual dictionary interactive element can zoom in on the selected portion of the image (e.g., the baby's head) and display the definition of the term 1308, as illustrated by FIG. 13B. The selection can be indicated by the user through touch input to the visual dictionary interactive element. For example, the user can tap on the baby's head or tap on term 1308 to cause the visual dictionary interactive element to display the definition 1310 of term 1308. To hide the definition and zoom back out on the image, the user can select (e.g., tap, double tap, etc.) image 1312 to display image 1302.

Figure 13C:
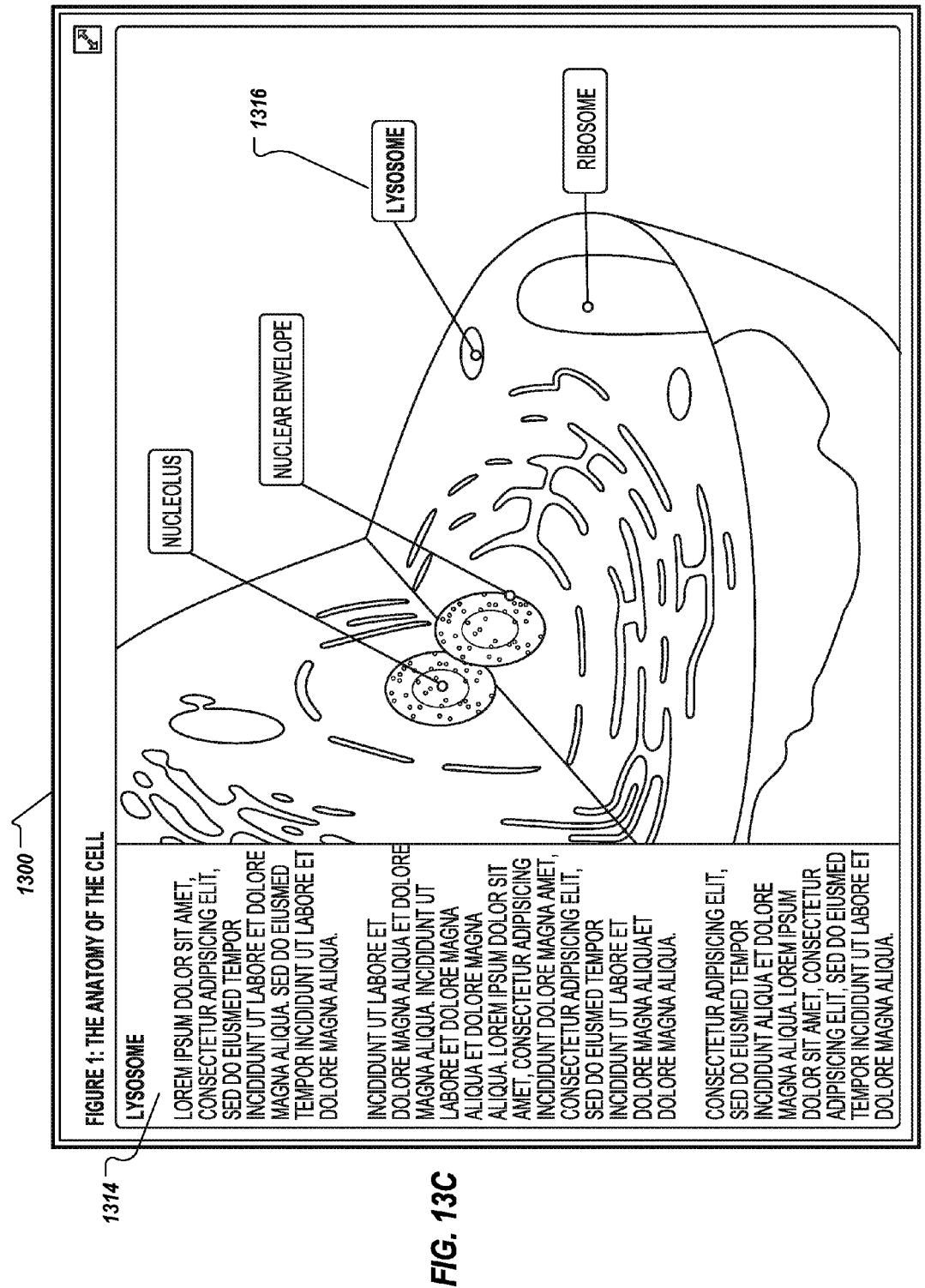

FIG. 13C illustrates an example visual dictionary interactive element definition display. For example, some terms may have long definitions that can overwhelm the image displayed in the visual dictionary interactive element. To overcome this problem, term definitions can be displayed in sidebar 1314. For example, when a user selects a term having a long definition (e.g., term 1316), sidebar 1314 can be displayed to provide an area for presenting the definition for the term. Sidebar 1314 can be permanently displayed on the dictionary interactive element. Sidebar 1314 can be temporarily displayed as needed when a term with a long definition is selected. For example, when a term with a short definition is selected, sidebar 1314 can be hidden and the definition for the term can be displayed in-line with the selected term.

Figure 13D:
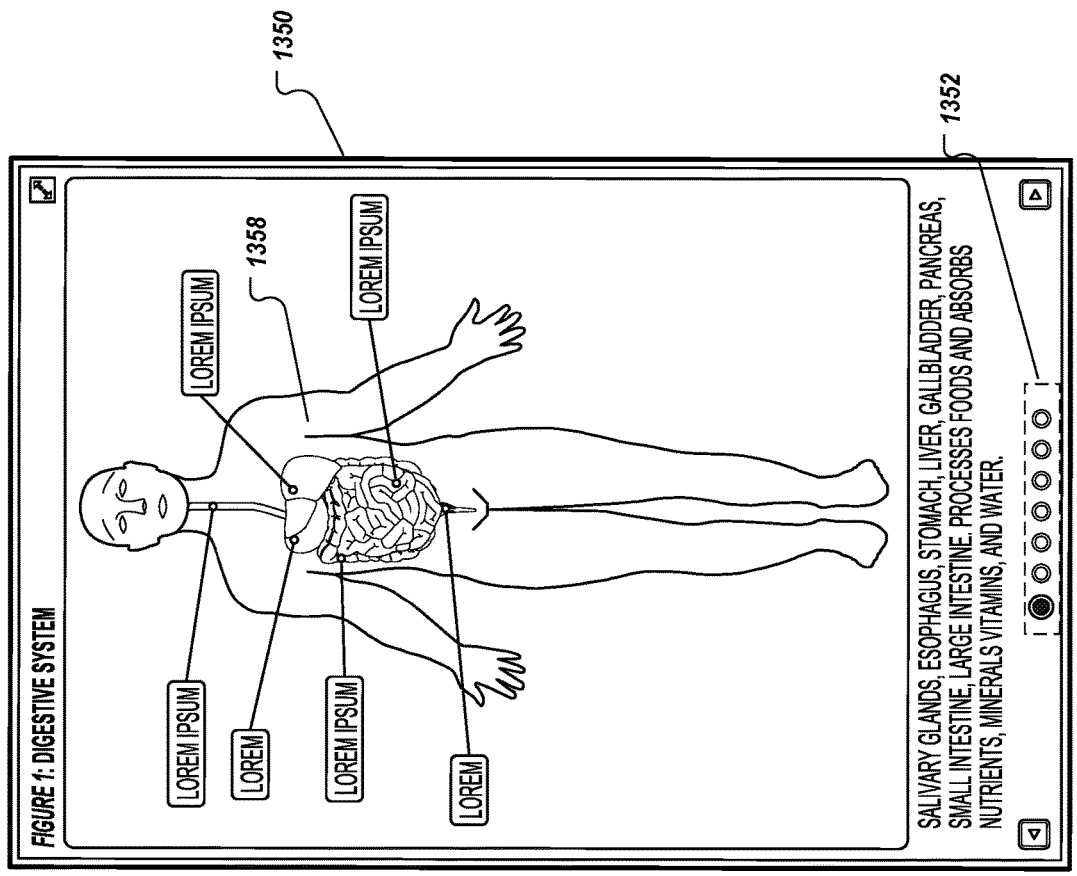
Figure 13E:
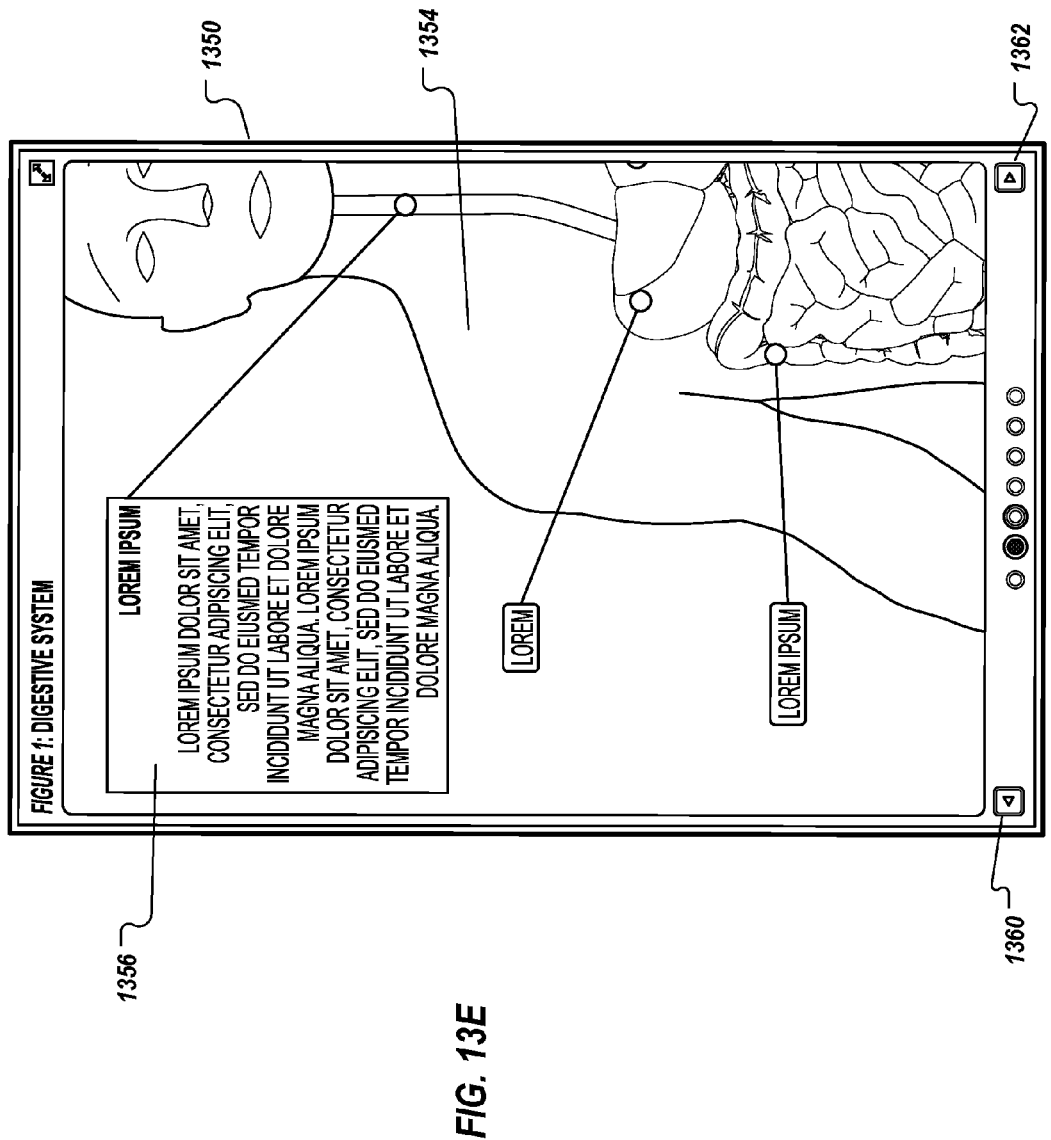

FIGS. 13D and 13E illustrate a visual dictionary interactive element 1350 configured to present a guided tour. For example, visual dictionary interactive element 1350 can be configured to present term definitions in a particular order. The author of the digital book may want to present information in a particular order to facilitate learning in a user. Thus, the visual dictionary interactive element guided tour allows a user to view the definitions of the terms presented according to an author-defined order. The user can proceed along the guided tour by selecting the buttons 1352 corresponding to the terms displayed on the visual dictionary interactive element. For example, the user can start with the left most button to start the tour. When the user selects the left most button, the user can be presented with a zoomed in view of the image 1354 and a definition of the term 1356 corresponding to the selected button, as illustrated by FIG. 13E. The user can select the zoomed in image 1354 to zoom out to the full image 1358 of FIG. 13D. The user can select the button to the right of the left most button to proceed to the next term definition. The user can continue selecting buttons 1352 in order from left to right to view the term definitions according to the order configured by the author. In some implementations, a user can select directional buttons 1360 and 1362 (FIG. 13D) to move between term definitions. For example, selection of button 1362 can cause the next term definition to display. Selection of button 1360 can cause the previous term definition to display.

HTML Interactive Element

In some implementations, a hypertext markup language (HTML) interactive element can be embedded in a digital book. The HTML interactive element can display HTML content (e.g., a web page). For example, the HTML interactive element can act like a browser by interpreting HTML code and presenting content according to the HTML instructions. The HTML interactive element can present HTML content from a local source (e.g., HTML encoded in the digital book). The HTML interactive element can download HTML content from web site hosted on a remote server (e.g., over a network, through the internet). For example, the author of the digital book can configure the HTML interactive element with a web site address (e.g., URL) so that when the HTML interactive element is displayed the HTML interactive element can download content from the web site and display the downloaded content.

Interactive Glossary

FIG. 14 illustrates an example interactive glossary interface 1400. In some implementations, interactive glossary interface can include a list of glossary terms 1402. For example, the glossary terms can be listed in a column format on the right or left side of glossary interface 1400. In some implementations, a user can search for a glossary term by inputting the term into search box 1401. For example, if the glossary term is found, the glossary term can be highlighted in the list of glossary terms 1402 and the glossary definition for the term can be displayed.

In some implementations, a user can select a glossary term 1404 from the list of glossary terms 1402 to cause a glossary definition 1406 to be displayed on glossary interface 1400. Glossary definition 1406 can include a textual description of the glossary term. Glossary definition 1406 can include an image representative or illustrative of the glossary term.

In some implementations, interactive glossary interface 1400 can list related glossary terms 1408. For example, the related glossary terms 1408 can be other terms within the glossary that are related to the currently selected or displayed glossary term (e.g., 1404). In some implementations, a user can select a related glossary term from the related glossary terms list 1408 to cause the related glossary term definition to be displayed.

In some implementations, interactive glossary interface 1400 can include an index of term references 1410. For example, index 1410 can display citations (e.g., chapter, page number, etc.) for locations in the digital book where the currently displayed glossary term can be found. In some implementations, a user can select an item in index 1410 to cause the cited location in the digital book to be displayed. For example, a user can select a chapter and page number citation in index 1410 to cause the portion of the digital book corresponding to the chapter and page number to be displayed.

FIG. 15 illustrates an example definition pop-over 1500. In some implementations, a definition pop-over 1500 can be presented to display a definition for selected or highlighted text 1502 in a digital book. For example, a user can select or highlight a word or phrase, as illustrated by FIGS. 4A and 4B. A heads up display (e.g., HUD 420, HUD 430) can be presented proximate to the highlighted or selected text. The user can select definition button 422 on HUD 420 to cause pop-over 1500 to be displayed. In some implementations, pop-over 1500 can be configured to display glossary term definitions and/or dictionary term definitions. For example, a user can select glossary button 1506 to display a glossary term definition 1508 for the highlighted or selected text. A user can select dictionary button 1504 to display a dictionary term definition for the highlighted or selected text. In some implementations, the dictionary term can be downloaded from a remote server or retrieved from a dictionary application or database local to the digital book device. In some implementations, a user can select button 1510 to cause interactive glossary interface 1400 to be displayed. For example, when glossary interface 1400 is displayed, the interface can display glossary information related to the highlighted or selected word or phrase, as described with reference to FIG. 14.

Figure 16:
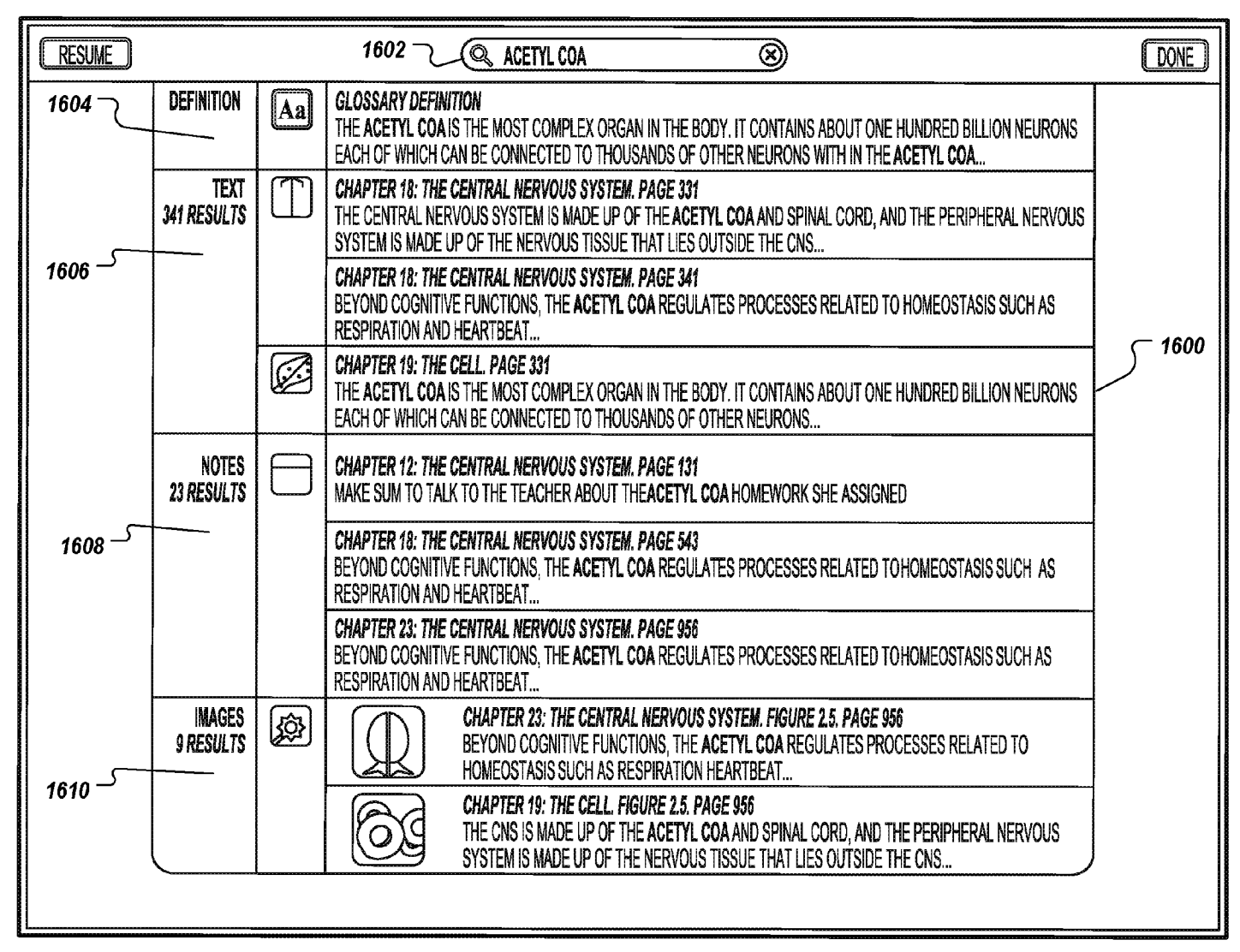

FIG. 16 illustrates an example search results interface 1600. In some implementations, a user can invoke a search interface by selecting graphical element 1520 of FIG. 15. The user can initiate a search by providing a search term to search field 1602. The results of the search can be displayed in search results interface 1600. In some implementations, search results interface 1600 can include search results from glossary terms 1604, text of the digital book 1606, notes associated with the digital book 1608, and a search of image descriptions 1610.

In some implementations, a user can select a search results item to display digital book content associated with the search results item. For example, a user can select a glossary term listed in glossary search results 1604 to cause interactive glossary interface 1400 to be displayed. Glossary interface 1400 can display the glossary information for the selected glossary search results term. The user can select text search results items 1606 to cause corresponding portions of the text of the digital book to be displayed. The user can select notes search results items 1608 to cause corresponding notes to be displayed. The user can select image search results items 1610 to cause corresponding images (or interactive interactive elements) in the digital book to be displayed.

FIG. 17 illustrates an example interface 1700 having glossary-linked terms. In some implementations, glossary terms for a section of a digital book can be identified and listed so that a user can easily review the terms for the section. For example, glossary terms can be highlighted and listed in terms list 1702. In some implementations, glossary terms in term list 1702 can be linked to the glossary. For example, a user can select glossary term 1704 in glossary terms list 1702 to cause interactive glossary interface 1400 to be displayed. When glossary interface 1400 is displayed, interface 1400 can display glossary information related to the selected term 1704 from term list 1702.

EXAMPLE PROCESSES

Figure 18A:
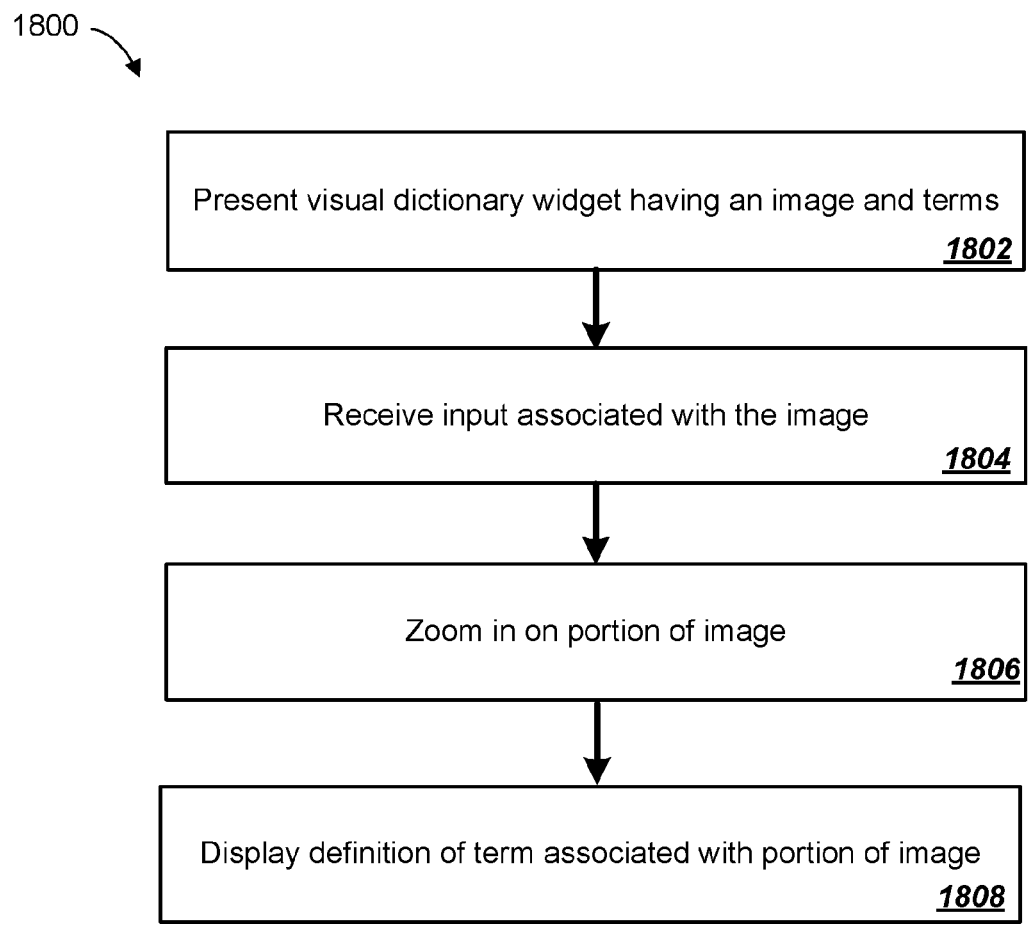
FIGS. 18A-18E are example processes providing interactive content for digital books.

FIG. 18A is an example process 1800 providing an interactive visual dictionary interactive element. In some implementations, a visual dictionary interactive element can be displayed (1802). The visual dictionary interactive element can display an image having callouts or placards associated with portions of the image. The callouts can include terms (e.g., glossary terms) that are defined by a digital book (e.g., defined in the glossary). The callouts can include terms that are defined by a dictionary available to the digital book application.

In some implementations, the visual dictionary interactive element can receive user input (1804). For example, a user can select one of the callouts that displays a term associated with the image. A user can select a portion of the image. For example, a user can provide touch input by tapping on a portion of the image to select the portion of the image.

In some implementations, in response to the user input (1804), the visual dictionary interactive element can zoom in on the portion of the image corresponding to the input (1806). For example, if a user selects a callout, the visual dictionary interactive element can zoom in on the portion of the image associated with the callout. If the user selects a portion of the image, the visual dictionary interactive element can zoom in on the selection portion of the image.

In some implementations, a definition of the term associated with the portion of the image can be displayed (1808). For example, the callout associated with the portion of the image can be expanded to accommodate a definition of the term corresponding to the callout. If the definition is lengthy, the term definition can be displayed in a sidebar proximate to the image.

In some implementations, when the user is done reviewing the term definition, the user can provide additional input to the visual dictionary interactive element to cause the interactive element to zoom out on the image. For example, the visual dictionary interactive element can zoom out so the user can view the entire image and all of the callouts and terms associated with the image.

Figure 18B:
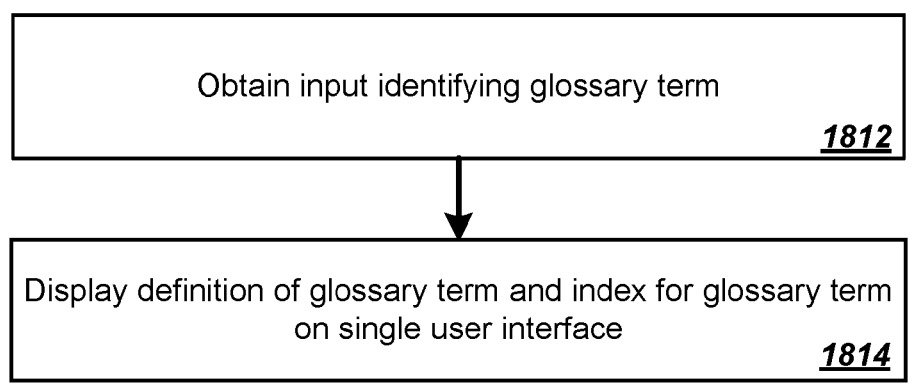

FIG. 18B is an example process 1810 providing a glossary interface. In some implementations, a glossary interface for a digital book can be presented. In some implementations, user input identifying a glossary term can be obtained (1812).

In some implementations, a definition of the glossary term and an index to the locations where the glossary term is recited in the digital book can be displayed in a single user interface (1814). For example, the single user interface can display both a glossary term and the location index information contemporaneously. For example, the index can be a list of locations where the glossary term is recited in the digital book. The list of locations can include citations for and/or links to locations within the digital book. In some implementations, the glossary interface can receive a selection of a location in the list of locations. In response to the selection, content corresponding to the location in the digital book can be displayed.

In some implementations, process 1810 can include displaying a list of related glossary terms. In some implementations, a user can select a related glossary term in the list of related glossary terms to cause the glossary interface to display a definition of the related glossary term and a list of locations where the related glossary term is recited in the digital book. Process 1810 can also include the functionality described with reference to FIGS. 14-17, above.

Figure 18C:
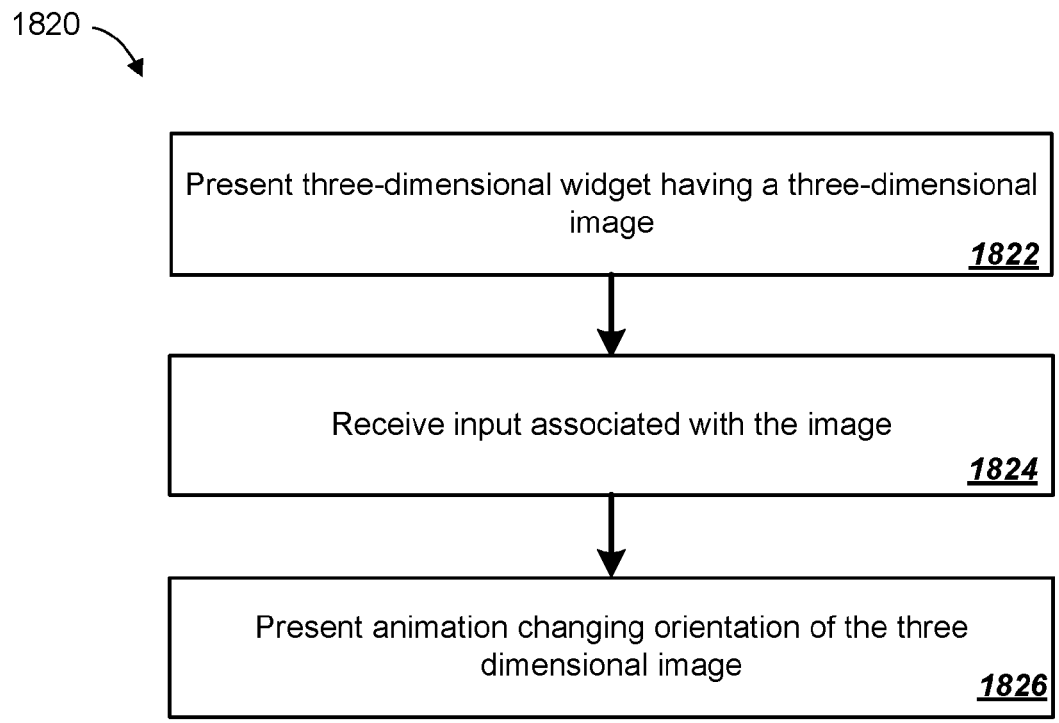

FIG. 18C is an example process 1820 providing an interactive three-dimensional interactive element. In some implementations, a three dimensional interactive element can be presented that has a three-dimensional image (1822). For example, the three-dimensional image can be a graphical model illustrating a real-world three-dimensional object. If a digital book is an architecture book, the three-dimensional object can be a three-dimensional representation of a building. If a digital book is a medical book, the three-dimensional object can be a three-dimensional representation of a human body.

In some implementations, input associated with the image can be received (1824). For example, a user can provide input to change the orientation of the three-dimensional image. The user can provide input that causes the image to rotate, for example. In some implementations, the user input can be touch input (e.g., a swipe gesture).

In some implementations, an animation can be presented that causes the three-dimensional image to appear to change orientation (1826). For example, if a user provides input to rotate the three-dimensional image, an animation can be presented that causes the three dimensional image to appear to rotate.

In some implementations, a three-dimensional visual dictionary interactive element can be presented to the user. For example, a three-dimensional visual dictionary interactive element can include the characteristics of the three-dimensional interactive element and the callouts, definitions, and interactions of the visual dictionary interactive element, described above.

Figure 18D:
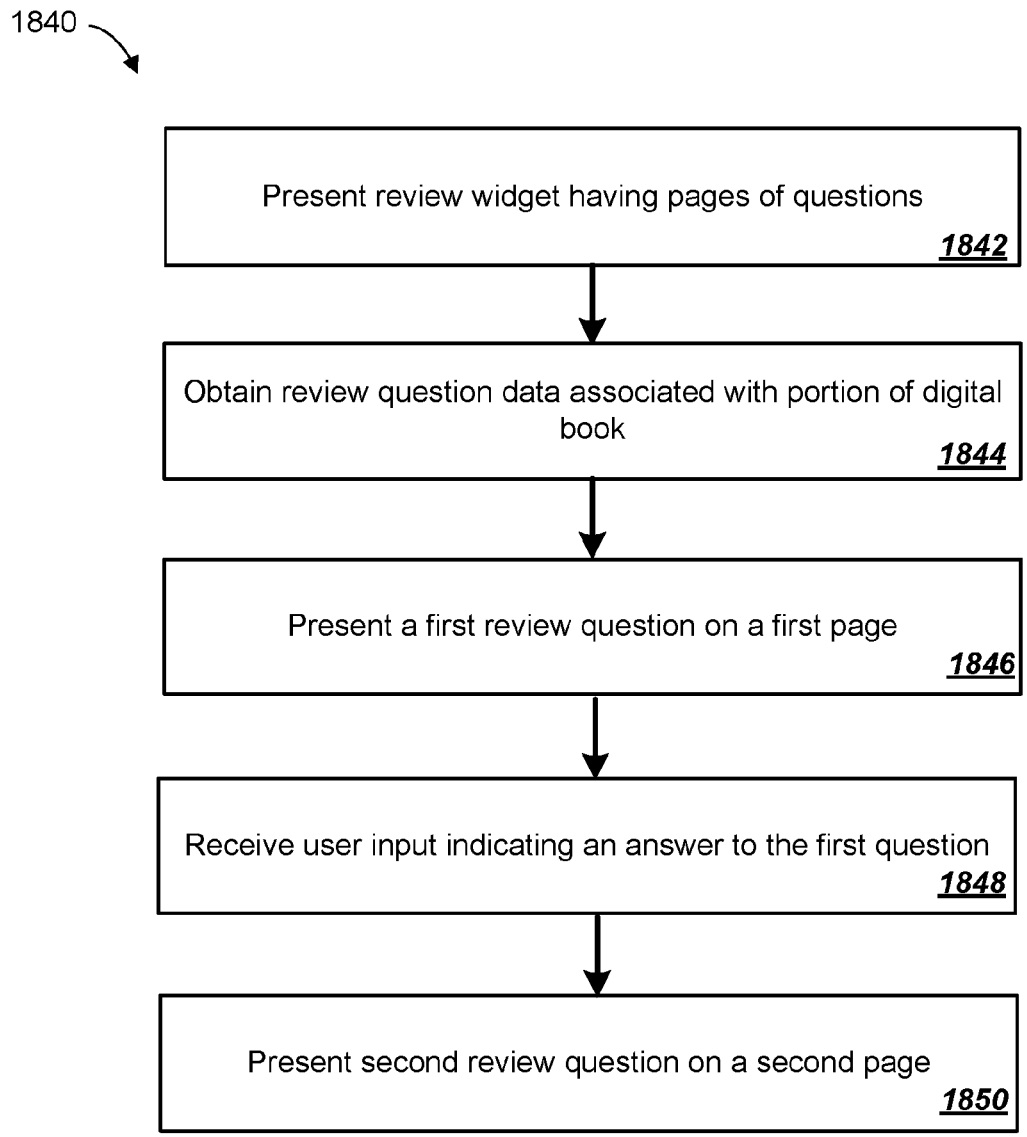

FIG. 18D is an example process 1840 providing an interactive review interactive element. In some implementations, a review interactive element can be presented (1842). For example, the review interactive element can contain pages of review questions for a user to answer. The questions can allow the user to test the user's knowledge of the subject matter described in the digital book.

In some implementations, review question data associated with a portion of the digital book can be obtained (1844). For example, an author of a digital book can configure the digital book with predefined review questions.

In some implementations, the review interactive element can present a first review question on a first page of the review interactive element (1846). For example, each review question can be presented on a different page of the review interactive element. Each review question can have a different question format, as described above.

In some implementations, the review interactive element can receive user input indicating an answer to the first question (1848). For example, the user can indicate an answer to various question types as indicated above with reference to FIGS. 12A-12K. In some implementations, the review interactive element can present a second review question on a second page of the review interactive element (1850). When the user has navigated all of the question pages of the review interactive element, the review interactive element can display a summary page indicating how many questions the user answered correctly. Other features of the review interactive element are described above with reference to FIGS. 12A-12K.

Figure 18E:
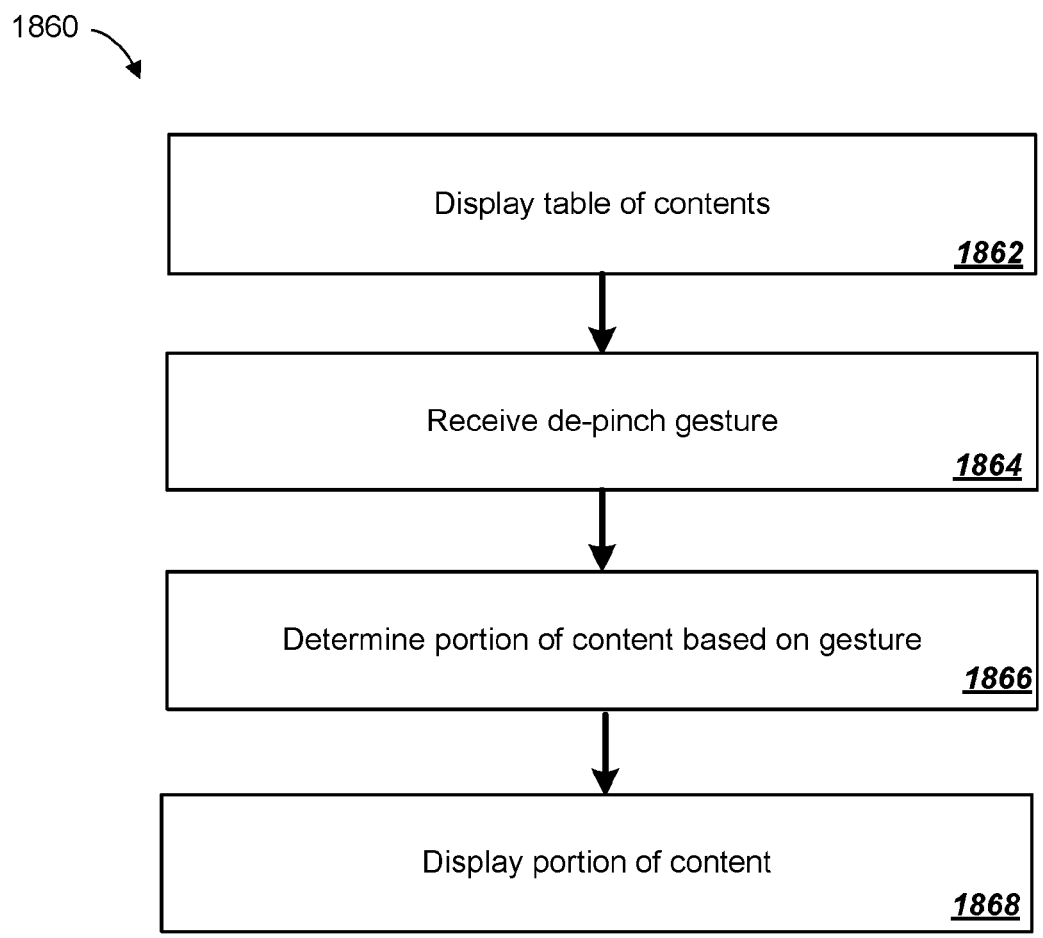

FIG. 18E is an example process 1860 providing an interactive table of contents. In some implementations, a table of contents can be displayed (1862). For example, a table of contents can be presented in portrait mode and can list chapters, subsections and topics covered by a digital book.

In some implementations, a de-pinch gesture can be received in the table of contents (1864). For example, a de-pinch gesture can be provided by a user by touching two fingers to a touch screen display and moving the fingers apart.

In some implementations, a portion of content can be determined based on the de-pinch gesture (1866). For example, if the de-pinch gesture is provided proximate to a particular section listed in the table of contents of the digital book, the portion of content can be content from the particular section of the book. In some implementations, the amount of content to display can be determined based on the de-pinch gesture. For example, a small de-pinch gesture (fingers move apart a short distance) can cause a small amount of content to be displayed. A larger de-pinch gesture can cause a larger amount of content to be displayed. A de-pinch gesture that is greater than a threshold amount (e.g., distance between the two fingers) can cause the table of contents to close and a section of the book to be displayed corresponding to the section of the table of contents where the de-pinch gesture was received. Once the portion of content is determined, the portion of content can be displayed (1868). Other features are described with reference to FIGS. 1-3 above.

Example Device Architecture

Figure 19:
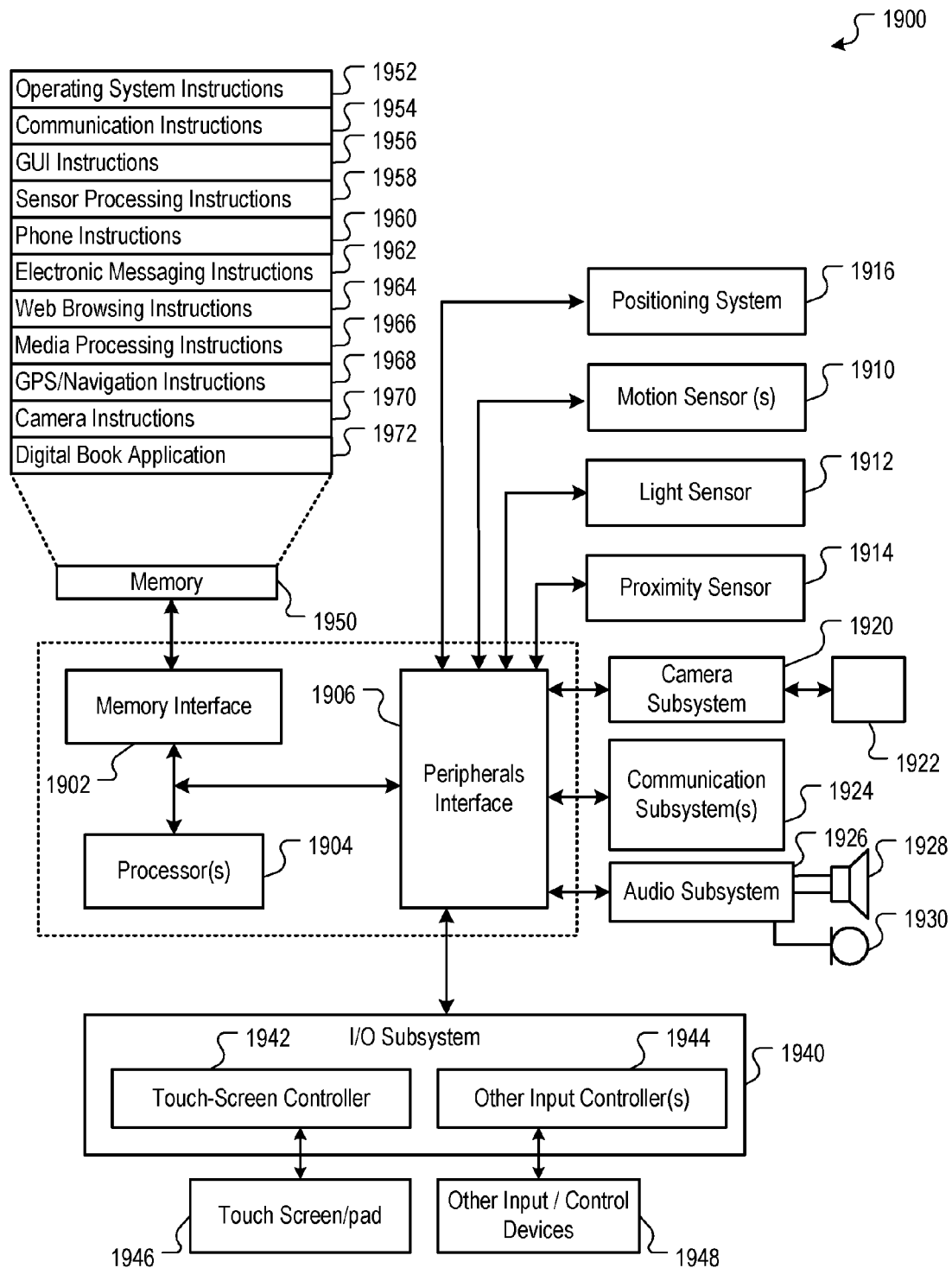
FIG. 19 is a block diagram of an example architecture for a device capable of running an application for presenting interactive content for digital books.

FIG. 19 is a block diagram of an exemplary architecture 1900 for a device capable of running an application for presenting interactive content for digital books. Architecture 1900 can include memory interface 1902, data processors, image processors and/or central processing units 1904 and peripherals interface 1906. Memory interface 1902, processors 1904 and/or peripherals interface 1906 can be separate components or can be integrated in one or more integrated circuits. The various components in the device can be coupled by one or more communication buses or signal lines.

Sensors, devices, and subsystems can be coupled to peripherals interface 1906 to facilitate multiple functionalities. For example, positioning system 1916, motion sensor 1910, light sensor 1912, and proximity sensor 1914 can be coupled to the peripherals interface 1906 to facilitate various positioning, orientation, lighting, and proximity functions. For example, in some implementations, light sensor 1912 can be utilized to facilitate adjusting the brightness of touch screen 1946. In some implementations, motion sensor 1911 (e.g., an accelerometer, velicometer, or gyroscope) can be utilized to detect movement of the device. Accordingly, display objects and/or media can be presented according to a detected orientation, e.g., portrait or landscape.

Other sensors can also be connected to peripherals interface 1906, such as a temperature sensor, a biometric sensor, a gyroscope, or other sensing device, to facilitate related functionalities.

Location determination functionality can be facilitated through positioning information from positioning system 1916. Positioning system 1916, in various implementations, can be a component internal to the device, or can be an external component coupled to the device (e.g., using a wired connection or a wireless connection). In some implementations, positioning system 1916 can include a Global Navigation Satellite System (GNSS) receiver or chipset, such as a Global Positioning System (GPS) receiver or chipset, and a positioning engine (e.g., including a Kalman filter) operable to derive positioning information from received GPS satellite signals. In other implementations, positioning system 1916 can include a magnetometer to provide direction indications (e.g., magnetic or true North). In still further implementations, positioning system 1916 can use wireless signals (e.g., cellular signals or 3G, WiFi or IEEE 802.11 signals) to determine location information associated with the device. Hybrid positioning can also be used. Other positioning systems are possible.

Camera subsystem 1920 and optical sensor 1922, e.g., a charged coupled device (CCD) or a complementary metal-oxide semiconductor (CMOS) optical sensor, can be utilized to facilitate camera functions, such as capturing photographs and video clips.

Communication functions can be facilitated through one or more communication subsystems 1924. Communication subsystem(s) can include one or more wireless communication subsystems and one or more wired communication subsystems. Wireless communication subsystems can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving and/or transmitting data. The specific design and implementation of communication subsystem 1924 can depend on the communication network(s) or medium(s) over which the device is intended to operate. For example, the device may include wireless communication subsystems designed to operate over a global system for mobile communications (GSM) network, a GPRS network, an enhanced data GSM environment (EDGE) network, 802.x communication networks (e.g., Wi-Fi, WiMax, or 3G networks), code division multiple access (CDMA) networks, and a Bluetooth™ network. Communication subsystems 1924 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1926 can be coupled to speaker 1928 and one or more microphones 1930. One or more microphones 1930 can be used, for example, to facilitate voice-enabled functions, such as voice recognition, voice replication, digital recording, and telephony functions.

I/O subsystem 1940 can include touch screen controller 1942 and/or other input controller(s) 1944. Touch-screen controller 1942 can be coupled to a touch surface 1946. Touch surface 1946 and touch screen controller 1942 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1946 or proximity to touch surface 1946.

Other input controller(s) 1944 can be coupled to other input/control devices 1948, such as one or more buttons, rocker switches, thumb-wheel, infrared port, USB port, and/or a pointer device such as a stylus. The one or more buttons (not shown) can include an up/down button for volume control of speaker 1928 and/or microphone 1930. A user of the device may customize a functionality of one or more of the buttons. Touch surface 1946 can be used to implement virtual or soft buttons and/or a keyboard. A user can perform input operations, such as selection and manipulation of graphical elements, by providing touch input to touch surface 1946.

In some implementations, the device can present recorded audio and/or video files, such as MP3, AAC, and MPEG files. In some implementations, the device can include the functionality of an MP3 player, such as an iPhone™.

Memory interface 1902 can be coupled to memory 1950. Memory 1950 can include high-speed random access memory and/or non-volatile memory, such as one or more magnetic disk storage devices, one or more optical storage devices, and/or flash memory (e.g., NAND, NOR). Memory 1950 can store operating system 1952, such as Darwin, RTXC, LINUX, UNIX, OS X, WINDOWS, or an embedded operating system such as VxWorks. Operating system 1952 may include instructions for handling basic system services and for performing hardware dependent tasks. In some implementations, the operating system 1952 can be a kernel (e.g., UNIX kernel).

Memory 1950 may also store communication instructions 1954 to facilitate communicating with one or more additional devices, one or more computers and/or servers. Communication instructions 1954 can also be used to select an operational mode or communication medium for use by the device, based on a geographic location (obtained by GPS/Navigation instructions 1968) of the device. Memory 1950 may include graphical user interface instructions 1956 to facilitate graphic user interface processing, such as described in reference to FIGS. 1-18; sensor processing instructions 1958 to facilitate sensor-related processing and functions; phone instructions 1960 to facilitate phone-related processes and functions; electronic messaging instructions 1962 to facilitate electronic-messaging related processes and functions; web browsing instructions 1964 to facilitate web browsing-related processes and functions; media processing instructions 1966 to facilitate media processing-related processes and functions; GPS/Navigation instructions 1968 to facilitate GPS and navigation-related processes and instructions, e.g., mapping a target location; camera instructions 1970 to facilitate camera-related processes and functions; and instructions for a digital book application 1972 for presenting interactive content for digital books. As described in reference to FIGS. 1-18. Memory 1950 may also store other software instructions (not shown), such as a search engine, Web video instructions to facilitate web video-related processes and functions; and/or web shopping instructions to facilitate web shopping-related processes and functions. In some implementations, media processing instructions 1966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 1950 can include additional instructions or fewer instructions. Furthermore, various functions of the device may be implemented in hardware and/or in software, including in one or more signal processing and/or application specific integrated circuits.

Network-Operating Environment for a Device

Figure 20:
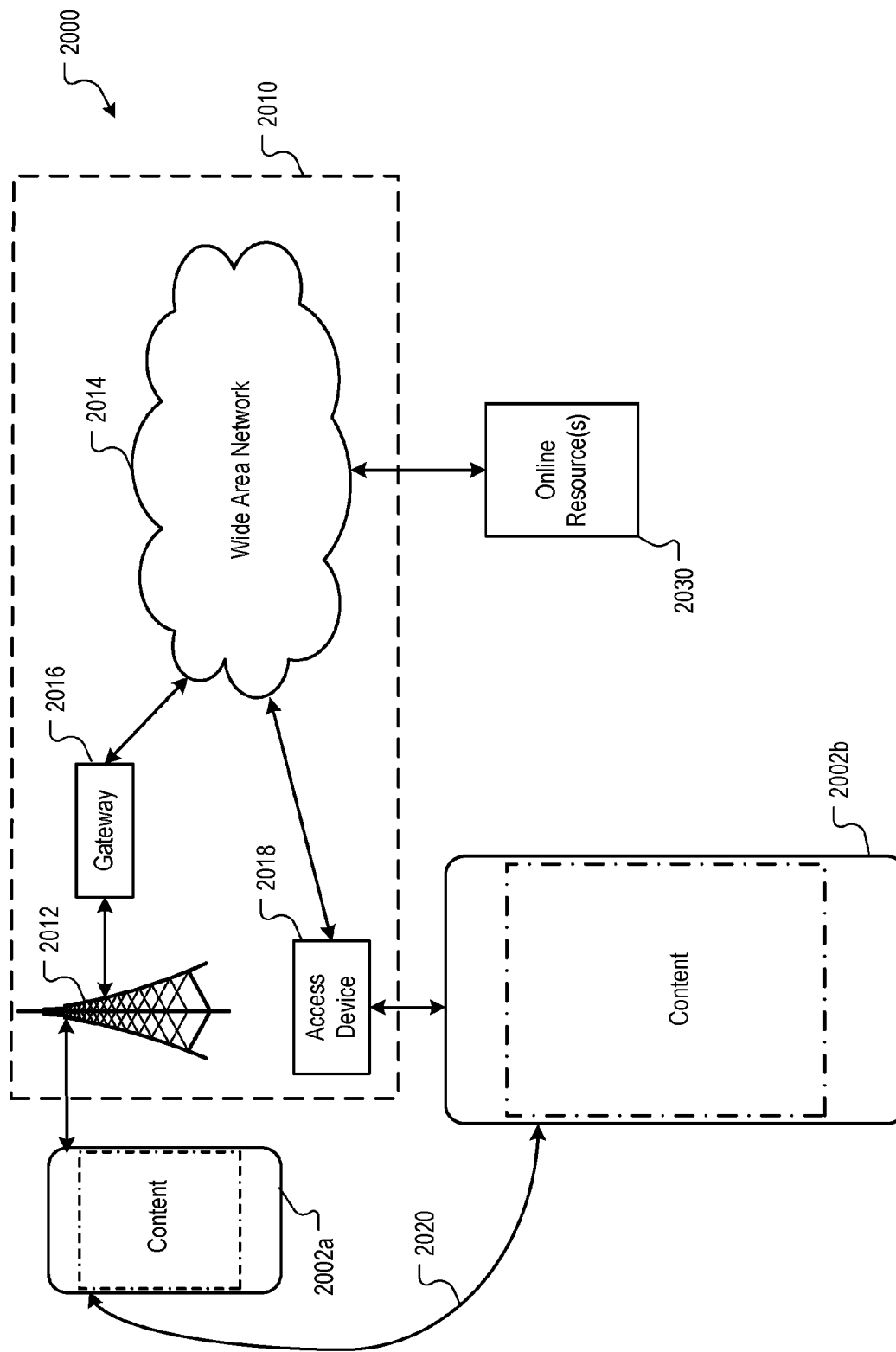
FIG. 20 is a block diagram of an example network-operating environment for the device of FIG. 19.

FIG. 20 is a block diagram of an example network-operating environment 2000 for the device of FIG. 19.

Devices 2002*a* and 2002*b* can communicate data over one or more wired and/or wireless networks 2010. For example, wireless network 2012, e.g., a cellular network, can communicate with wide area network (WAN) 2014, such as the Internet, by use of gateway 2016. Likewise, access device 2018 (access point or AP)), such as an 802.11g wireless access device, can provide communication access to the wide area network 2014. In some implementations, both voice and data communications can be established over wireless network 2012 and access device 2018. For example, device 2002*a* can place and receive phone calls (e.g., using VoIP protocols), send and receive e-mail messages (e.g., using POP3 protocol), and retrieve electronic documents and/or streams, such as web pages, photographs, and videos, over wireless network 2012, gateway 2016, and wide area network 2014 (e.g., using TCP/IP or UDP protocols). Likewise, in some implementations, device 2002*b* can place and receive phone calls, send and receive e-mail messages, and retrieve electronic documents over access device 2018 and wide area network 2014. In some implementations, devices 2002*a* or 2002*b* can be physically connected to access device 2018 using one or more cables and the access device 2018 can be a personal computer. In this configuration, device 2002*a* or 2002*b* can be referred to as a "tethered" device.

Devices 2002*a* and 2002*b* can also establish communications by other means. For example, wireless device 2002*a* can communicate with other wireless devices, e.g., other devices 2002*a* or 2002*b*, cell phones, etc., over wireless network 2012. Likewise, devices 2002*a* and 2002*b* can establish peer-to-peer communications 2020, e.g., a personal area network, by use of one or more communication subsystems, such as a Bluetooth™ communication device. Other communication protocols and topologies can also be implemented.

Devices 2002*a* or 2002*b* can communicate with one or more services over one or more wired and/or wireless networks 2010. These services can include, for example, online resources 2030, such as an online store for accessing, purchasing, and/or downloading digital books to the devices 2002*a* and/or 2002*b*.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, many of the examples presented in this document were presented in the context of an ebook. The systems and techniques presented herein are also applicable to other electronic text such as electronic newspaper, electronic magazine, electronic documents etc. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of presenting a glossary in a digital book, the method comprising:
   receiving user input selecting text corresponding to particular content displayed at a particular location within digital book;
   displaying, in response to receiving user input selecting text, an interactive glossary interface, the glossary interface including a plurality of glossary terms, each associated with the text shown in the particular content displayed at the particular location within the digital book;
   receiving, at the interactive glossary interface, user input identifying a particular one of the plurality of glossary terms at the particular location within the digital book; and
   displaying in the interactive glossary interface, in response to the obtaining user input identifying the particular one of the plurality of glossary terms, a glossary term definition of the particular one of the plurality of glossary terms and a list citing locations, other than the particular location, within the digital book where the particular one of the plurality of glossary terms is additionally recited within the digital book.

2. The method of claim 1, further comprising:
   receiving, at the interactive glossary interface, a user selection of a selected location in the list citing locations; and
   displaying in the interactive glossary interface, in response to the receiving a user selection, additional content corresponding to the selected location within the digital book.

3. The method of claim 2, further comprising:
   displaying, in the interactive glossary interface, a list of related glossary terms, each related glossary term being related to the particular one of the plurality of glossary terms.

4. The method of claim 3, further comprising:
   receiving a selection of one of the related glossary terms in the list of related glossary terms; and
   displaying in the interactive glossary interface, in response to the receiving a selection, a glossary term definition of the one of the related glossary terms and a list of locations where the one of the related glossary terms is recited in the digital book.

5. The method of claim 1, wherein receiving user input selecting text corresponding to particular content displayed at a particular location within a digital book comprises:

receiving, in the interactive glossary interface, a search query including a search term;

in response to the receiving a search query, performing a search based on the search query;

presenting in the interactive glossary interface, in response to the performing a search, search results indicating that the search term is a glossary term; and in response to the presenting search results, receiving, in the interactive glossary interface, user input selecting the particular one of the plurality of glossary terms from the search results.

6. The method of claim 5, wherein presenting, in the interactive glossary interface, search results indicating that the search term is a glossary term, comprises:

presenting, in the interactive glossary interface, a search results interface associated with the search term, wherein the search results interface displays the glossary term definition, the list of citing locations, notes associated within the digital book for the search term, and images within the digital book associated with the search term.

7. The method of claim 1, further comprising displaying in the interactive glossary interface, in response to the obtaining user input identifying the particular one of the plurality of glossary terms, an image representative of the particular one of the plurality of glossary terms.

8. A system for presenting a glossary in a digital book, comprising:

one or more processors;

memory coupled to the one or more processors and configured for storing instructions, which, when executed by the one or more processors, performs operations comprising:

receiving user input selecting text corresponding to particular content displayed at a particular location within a digital book;

displaying, in response to receiving user input selecting text, an interactive glossary interface, the glossary interface including a plurality of glossary terms, each associated with the text shown in the particular content displayed at the particular location within the digital book;

receiving, at the interactive glossary interface, user input identifying a particular one of the plurality of glossary terms at the particular location within the digital book; and displaying in the interactive glossary interface, in response to the obtaining user input identifying the particular one of the plurality of glossary terms, a glossary term definition of the particular one of the plurality of glossary terms and a list citing locations, other than the particular location, within the digital book where the particular one of the plurality of glossary terms is additionally recited within the digital book.

9. The system of claim 8, further comprising:

receiving, at the interactive glossary interface, a user selection of a selected location in the list citing locations; and displaying in the interactive glossary interface, in response to the receiving a user selection, additional content corresponding to the selected location within the digital book.

10. The system of claim 9, further comprising:

displaying, in the interactive glossary interface, a list of related glossary terms, each related glossary term being related to the particular one of the plurality of glossary terms.

11. The system of claim 10, further comprising:

receiving a selection of one of the related glossary terms in the list of related glossary terms; and displaying in the interactive glossary interface, in response to the receiving a selection, a glossary term definition of the one of the related glossary terms and a list of locations where the one of the related glossary terms is recited in the digital book.

12. The system of claim 8, wherein receiving user input selecting text corresponding to particular content displayed at a particular location within a digital book comprises:

receiving, in the interactive glossary interface, a search query including a search term;

in response to the receiving a search query, performing a search based on the search query;

presenting in the interactive glossary interface, in response to the performing a search, search results indicating that the search term is a glossary term; and in response to the presenting search results, receiving, in the interactive glossary interface, user input selecting the particular one of the plurality of glossary terms from the search results.

13. The system of claim 12, wherein presenting, in the interactive glossary interface, search results indicating that the search term is a glossary term, comprises:

presenting, in the interactive glossary interface, a search results interface displaying the search results, wherein the display of the search results, in the search results interface, includes display of the glossary term definition, the list of citing locations, notes associated within the digital book for the search term, and images within the digital book associated with the search term.

14. The system of claim 8, further comprising displaying in the interactive glossary interface, in response to the obtaining user input identifying the particular one of the plurality of glossary terms, an image representative of the particular one of the plurality of glossary terms.

15. A program storage device, readable by a programmable control device, comprising instructions stored thereon for causing the programmable control device to perform operations comprising:

receiving user input selecting text corresponding to particular content displayed at a particular location within a digital book;

displaying, in response to receiving user input selecting text, an interactive glossary interface, the glossary interface including a plurality of glossary terms, each associated with the text shown in the particular content displayed at the particular location within the digital book;

receiving, at the interactive glossary interface, user input identifying a particular one of the plurality of glossary terms at the particular location within the digital book; and displaying in the interactive glossary interface, in response to the obtaining user input identifying the particular one of the plurality of glossary terms, a glossary term definition of the particular one of the plurality of glossary terms and a list citing locations, other than the particular location, within the digital book where the particular one of the plurality of glossary terms is additionally recited within the digital book.

16. The program storage device of claim 15, further comprising:
receiving, at the interactive glossary interface, a user selection of a selected location in the list citing locations; and
displaying in the interactive glossary interface, in response to the receiving a user selection, additional content corresponding to the selected location within the digital book.

17. The program storage device of claim 16, further comprising:
displaying, in the interactive glossary interface, a list of related glossary terms, each related glossary term being related to the particular one of the plurality of glossary terms.

18. The program storage device of claim 17, further comprising:
receiving a selection of one of the related glossary terms in the list of related glossary terms; and
displaying in the interactive glossary interface, in response to the receiving a selection, a glossary term definition of the one of the related glossary terms and a list of locations where the one of the related glossary terms is recited in the digital book.

19. The program storage device of claim 15, wherein receiving user input selecting text corresponding to particular content displayed at a particular location within a digital book comprises:
receiving, in the interactive glossary interface, a search query including a search term;
in response to the receiving a search query, performing a search based on the search query;
presenting in the interactive glossary interface, in response to the performing a search, search results indicating that the search term is a glossary term; and
in response to the presenting search results, receiving, in the interactive glossary interface, user input selecting the particular one of the plurality of glossary terms from the search results.

20. The program storage device of claim 19, wherein presenting, in the interactive glossary interface, search results indicating that the search term is a glossary term, comprises:
presenting, in the interactive glossary interface, a search results interface displaying the search results,
wherein the display of the search results, in the search results interface, includes display of the glossary term definition, the list of citing locations, notes associated within the digital book for the search term, and images within the digital book associated with the search term.

21. The program storage device of claim 15, further comprising displaying in the interactive glossary interface, in response to the obtaining user input identifying the particular one of the plurality of glossary terms, an image representative of the particular one of the plurality of glossary terms.

* * * * *